United States Patent
Lee et al.

(10) Patent No.: US 12,078,887 B2
(45) Date of Patent: Sep. 3, 2024

(54) DISPLAY APPARATUS AND BACKLIGHT UNIT

(71) Applicant: SAMSUNG ELECTRONICS CO., LTD., Suwon-si (KR)

(72) Inventors: Youngmin Lee, Suwon-si (KR); Sungyeol Kim, Suwon-si (KR); Hyungsuk Kim, Suwon-si (KR); Seungyong Shin, Suwon-si (KR); Kyehoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/843,413

(22) Filed: Jun. 17, 2022

(65) Prior Publication Data

US 2023/0055132 A1 Feb. 23, 2023

Related U.S. Application Data

(63) Continuation of application No. PCT/KR2022/007455, filed on May 25, 2022.

(30) Foreign Application Priority Data

Aug. 17, 2021 (KR) .................. 10-2021-0108139

(51) Int. Cl.
G02F 1/13357 (2006.01)
(52) U.S. Cl.
CPC .. *G02F 1/133608* (2013.01); *G02F 1/133603* (2013.01); *G02F 1/133611* (2013.01)

(58) Field of Classification Search
CPC ......... G02F 1/133608; G02F 1/133603; G02F 1/133611
(Continued)

(56) References Cited

U.S. PATENT DOCUMENTS 8,305,516 B2 11/2012 Cho et al.
9,123,299 B2 9/2015 Kim et al.
(Continued)

FOREIGN PATENT DOCUMENTS

JP 5014412 B2 8/2012
JP 2020-27273 A 2/2020
(Continued)

OTHER PUBLICATIONS

International Search Report (PCT/ISA/210) and Written Opinion (PCT/ISA/237) dated Sep. 13, 2022 issued by the International Searching Authority in International Application No. PCT/KR2022/007455.

*Primary Examiner* — Charles S Chang
(74) *Attorney, Agent, or Firm* — Sughrue Mion, PLLC

(57) ABSTRACT

A display apparatus including a liquid crystal panel; and a backlight unit configured to emit light to the liquid crystal panel is provided. The backlight unit includes a bottom chassis; a first interface board disposed on a front surface of the bottom chassis; a plurality of light source modules disposed on the front surface of the bottom chassis, arranged at predetermined intervals, and each of the plurality of light source modules having one end connected to the first interface board; and a second interface board disposed on a rear surface of the bottom chassis and connected to the first interface board.

18 Claims, 14 Drawing Sheets

(58) Field of Classification Search
USPC .................................................... 349/58–68
See application file for complete search history.

(56) References Cited

U.S. PATENT DOCUMENTS

| | | | |
|---|---|---|---|
| 11,709,395 | B2 | 7/2023 | Lee et al. |
| 2007/0047220 | A1* | 3/2007 | Kang .................. G09G 3/3413 362/97.2 |
| 2009/0073109 | A1* | 3/2009 | Shin .................... G09G 3/3413 345/102 |
| 2009/0168455 | A1 | 7/2009 | Kim et al. |
| 2018/0045877 | A1* | 2/2018 | Shimizu ............ G02F 1/133608 |
| 2019/0146275 | A1* | 5/2019 | Shinya .................. H01R 13/20 362/249.02 |
| 2020/0150491 | A1 | 5/2020 | Jang et al. |
| 2020/0382740 | A1 | 12/2020 | Zhou et al. |
| 2022/0270562 | A1 | 8/2022 | Jung et al. |

FOREIGN PATENT DOCUMENTS

| | | |
|---|---|---|
| KR | 1020100080024 A | 7/2010 |
| KR | 1020110035836 A | 4/2011 |
| KR | 10-2016-0057919 A | 5/2016 |
| KR | 10-2018-0099993 A | 9/2018 |
| KR | 1020200053869 A | 5/2020 |
| KR | 1020210057417 A | 5/2021 |

* cited by examiner

DISPLAY APPARATUS AND BACKLIGHT UNIT

CROSS-REFERENCE TO RELATED APPLICATION(S)

This application is a by-pass continuation of International Application No. PCT/KR2022/007455, filed on May 25, 2022, filed in the Korean Intellectual Property Receiving Office, which is based on and claims priority under 35 U. S. C. § 119 to Korean Patent Application No. 10-2021-0108139 filed on Aug. 17, 2021, the disclosures of which are incorporated herein by reference in their entireties.

BACKGROUND

1. Field

The disclosure relates to a display apparatus capable of driving light sources of a backlight unit in an active matrix method and the backlight unit.

2. Discussion of Related Art

A display apparatus may include a display panel to display an image by controlling amounts of light emitted from the respective pixels of the display panel. The display panel may be classified into a self-luminous display panel that emits light by itself based on an image and a non-luminous display panel that blocks or passes light emitted from an extra light source based on an image. A liquid crystal display ("LCD") panel is an example of the non-luminous display panel.

The LCD panel may include a liquid crystal panel and a backlight unit, and the liquid crystal panel may display an image by blocking or passing light emitted from the backlight unit. The backlight unit may be classified by the position of the light source into an edge-type backlight unit and a direct-type backlight unit.

In related art, a direct-type backlight unit may include a light source module having many light emitting diodes ("LEDs") arranged on a plate-shaped substrate of the same size as the liquid crystal panel. It has a problem with maintenance and repair of the backlight unit when a malfunction occurs to the light source module.

SUMMARY

The disclosure provides a display apparatus and backlight unit capable of attaining high brightness and a high contrast ratio with a reduced number of light emitting diodes (LEDs) by applying a plurality of bar-shaped light source modules.

The disclosure also provides a display apparatus and backlight unit capable of enabling enhanced local dimming by providing signals to driving devices included in bar-shaped light source modules in an active matrix method.

According to an embodiment of the disclosure, A display apparatus may the provided. The display apparatus may include a liquid crystal panel; and a backlight unit configured to emit light to the liquid crystal panel. The backlight unit may include a bottom chassis; a first interface board located on a front surface of the bottom chassis; a plurality of light source modules located on the front surface of the bottom chassis, arranged at predetermined intervals, and each of the plurality of light source modules having one end connected to the first interface board; and a second interface board located on a rear surface of the bottom chassis and connected to the first interface board.

The plurality of light source modules may include a substrate; a plurality of light sources mounted on the substrate; a plurality of dimming blocks formed to include at least one of the plurality of light sources; and one or more driving devices mounted on the substrate and configured to control the at least one of the plurality of light sources included in each of the plurality of dimming blocks.

The display apparatus may include the plurality of dimming blocks being divided into a first group and a second group; the one or more driving devices may include a first driving device and a second driving device, the first driving device may be configured to control first light sources included in dimming blocks of the first group, and the second driving device may be configured to control second light sources included in dimming blocks of the second group.

The display apparatus may further include a dimming driver mounted on the first interface board or the second interface board, the dimming driver being configured to provide dimming signals to the one or more driving devices based on dimming data transmitted from a processor.

The dimming driver may be configured to provide the dimming signals to the one or more driving devices in an active matrix method.

The one or more driving one or more driving devices may define a plurality of rows and a plurality of columns, and the dimming driver may be configured to provide a scan signal to the one or more driving devices arranged in one of the plurality of rows, and provide the dimming signals to the one or more driving devices in the plurality of columns.

The display apparatus may include plurality of light sources being mounted on the substrate in predetermined arrangement, and each of the plurality of dimming blocks may include two or more neighboring light sources.

The plurality of light sources may include a light emitting diode (LED) contacting wiring on the substrate; and an optical dome covering the LED.

The plurality of light source modules may include a connector arranged at the one end of the substrate to couple the substrate to the first interface board.

The display apparatus may further include a connection line passing through the bottom chassis and connecting between the first interface board and the second interface board.

A backlight unit may be provided. The backlight unit may include a bottom chassis; a first interface board located on a front surface of the bottom chassis; a plurality of light source modules located on the front surface of the bottom chassis, arranged at predetermined intervals, and each of the plurality of light source modules having one end connected to the first interface board; and a second interface board located on a rear surface of the bottom chassis and connected to the first interface board.

BRIEF DESCRIPTION OF THE DRAWINGS

The above and other aspects, features and advantages of the disclosure will become more apparent from the following detailed description of exemplary embodiments in conjunction with the accompanying drawings, in which.

DETAILED DESCRIPTION OF EXEMPLARY EMBODIMENTS

Figure 1:
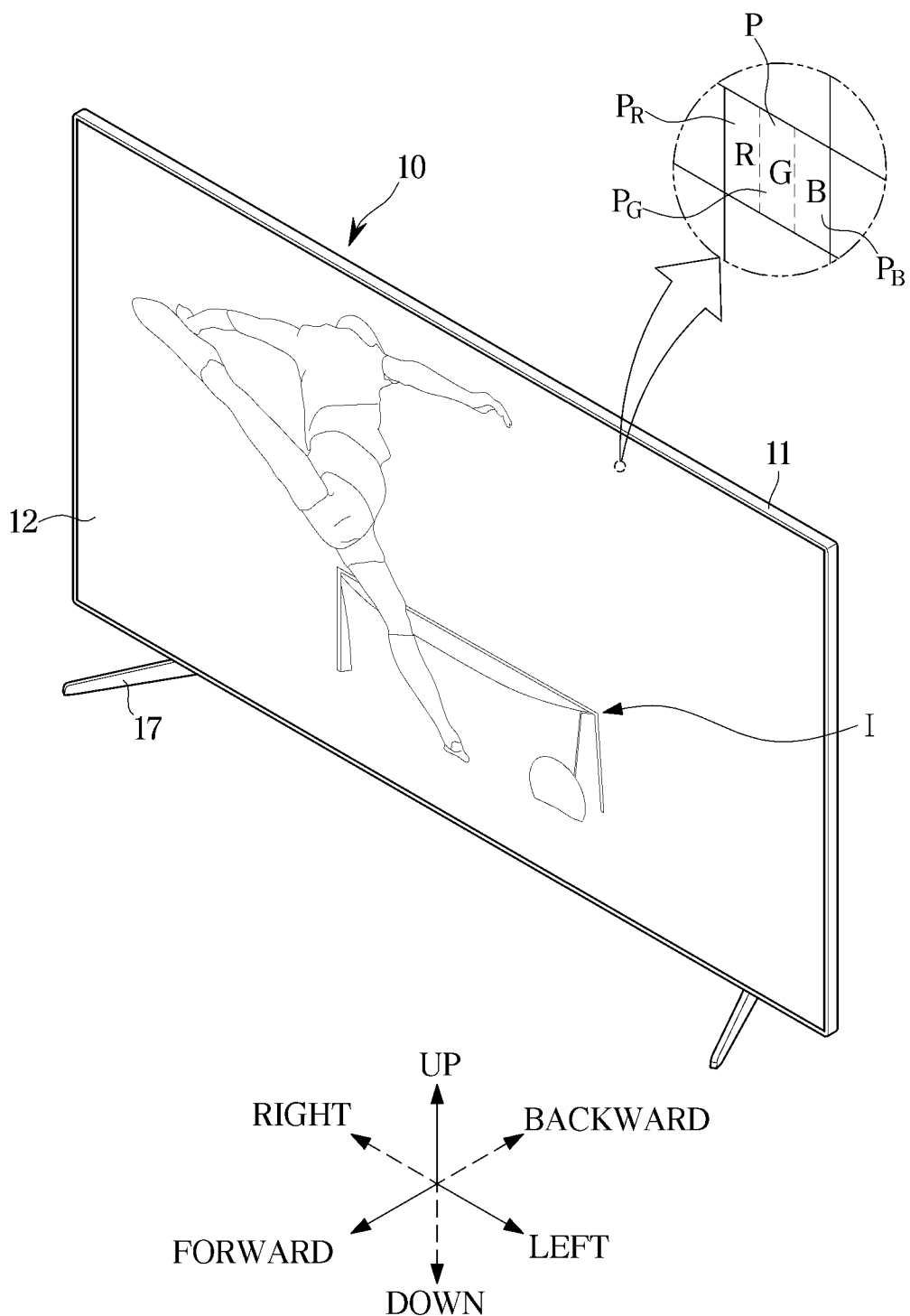
FIG. 1 is an exterior view of a display apparatus, according to an embodiment of the disclosure.

The embodiments described herein and illustrated in the drawings are non-limiting example embodiments, so it should be understood that they may be replaced with various equivalents and modifications according to the disclosure.

Like numerals refer to like elements throughout the specification. Not all elements of embodiments of the disclosure may be described, and description of what are commonly known in the art or what overlap each other in the embodiments may be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network. The term "include (or including)" or "comprise (or comprising)" is inclusive or open-ended and does not exclude additional, unrecited elements or method steps, unless otherwise mentioned. Throughout the specification, when it is said that a member is located "on" another member, it implies not only that the member is located adjacent to the other member but also that a third member exists between the two members.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer or section. It is to be understood that the singular forms "a," "an," and "the" include plural references unless the context clearly dictates otherwise. Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

FIG. 1 is an exterior view of a display apparatus, according to an embodiment of the disclosure.

A display apparatus 10 is a device that is able to process image signals received from the outside and visually present the processed image. In the following description, it is assumed that the display apparatus 10 is a television ("TV"), but embodiments of the disclosure are not limited thereto. For example, the display apparatus 10 may be a monitor, a portable multimedia device, a portable communication device, and any device capable of visually presenting images, without being limited thereto.

The display apparatus 10 may also be a large format display ("LFD") installed outdoors such as on a rooftop of a building or at a bus stop. In this case, however, the display apparatus 10 may not exclusively be installed outdoors, but may be installed at any place, even indoors with a lot of foot traffic, e.g., at subway stations, shopping malls, theaters, offices, stores, etc.

The display apparatus 10 may receive contents including video and audio signals from various content sources and output video and audio corresponding to the video and audio signals. For example, the display apparatus 10 may receive content data through a broadcast receiving antenna or a cable, receive content data from a content reproducing device, or receive content data from a content providing server of a content provider.

Referring to FIG. 1, the display apparatus 10 may include a main body 11 and a screen 12 for displaying an image I. The main body 11 forms the exterior of the display apparatus 10, and components for the display apparatus 10 to display the image I or perform many different functions may be included in the main body 11. Although the main body 11 may have a flat plate shape, it may have various other shapes. For example, the main body 11 may have the form of a curved plate.

The screen 12 may be formed on the front of the main body 11 for displaying the image I. For example, the screen 12 may display still images or moving images. For example, the screen 12 may display two dimensional (2D) plane images, or three dimensional (3D) stereographic images using parallax of both eyes of the user. The screen 12 may include a self-luminous panel (e.g., a light emitting diode ("LED") panel or an organic LED ("OLED") panel) capable of emitting light at first hand, or non-luminous panel (e.g., a liquid crystal panel) using light emitted from a backlight unit.

A plurality of pixels P are formed on the screen 12, and the image I displayed on the screen 12 may be formed by the light emitted by each of the plurality of pixels P. For example, the light emitted by each of the plurality of pixels P may be combined like mosaics into the image I on the screen 12. Each of the plurality of pixels P may emit light in various colors and brightnesses. Each of the plurality of pixels P may include subpixels $P_R$, $P_G$, and $P_B$ to emit different colors of light.

The subpixels $P_R$, $P_G$, and $P_B$ may include a red subpixel $P_R$ to emit red light, a green subpixel $P_G$ to emit green light, and blue subpixel $P_B$ to emit blue light. For example, the red light may have wavelengths of about 620 nanometers (nm, a billionth of a meter) to about 750 nm; green light may have wavelengths of about 495 nm to about 570 nm; blue light may have wavelengths of about 430 nm to about 495 nm. By combinations of the red light of the red subpixel $P_R$, the green light of the green subpixel $P_G$, and the blue light of the blue subpixel $P_B$, the pixel may emit various brightnesses and colors of light.

Figure 2:
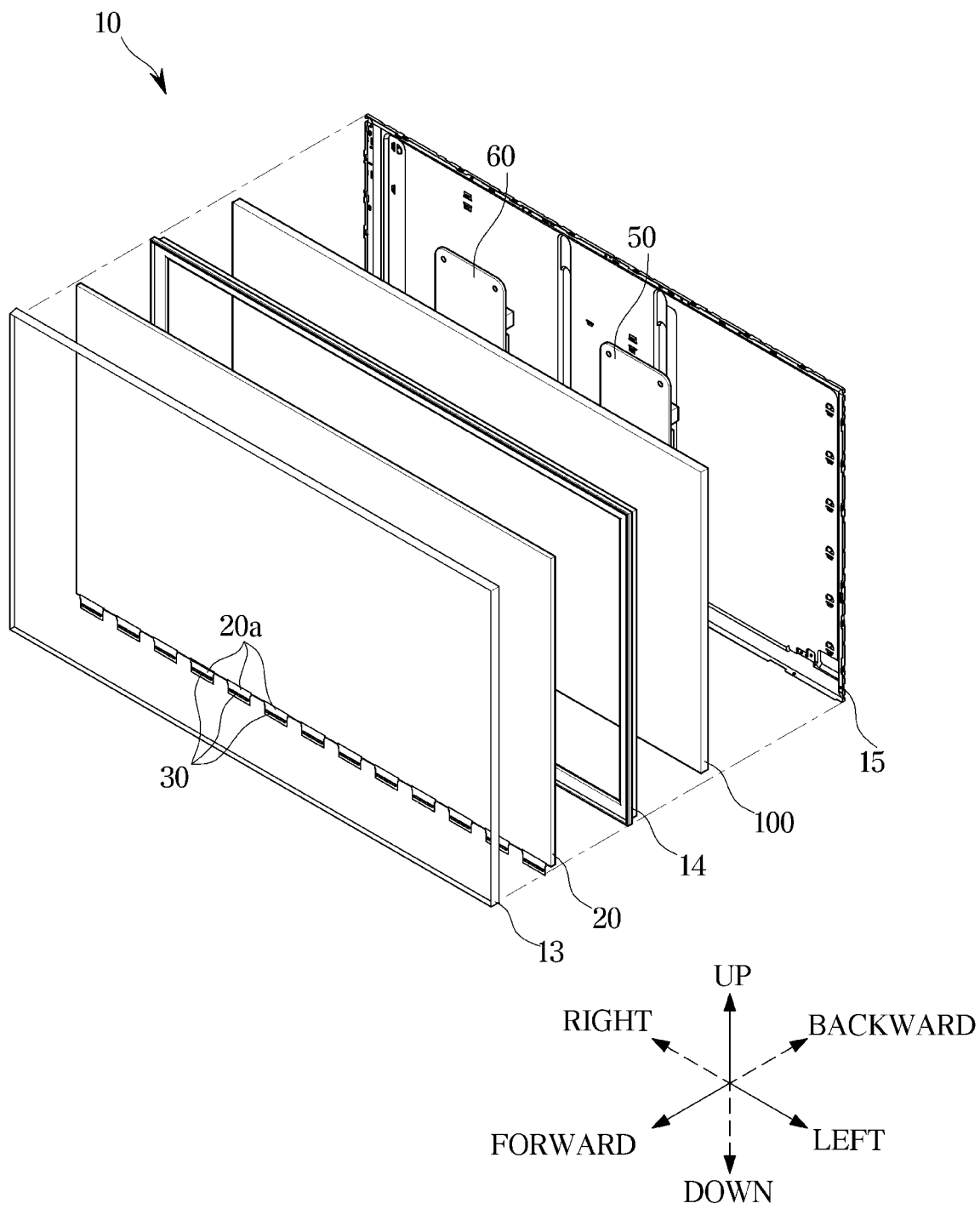
FIG. 2 is an exploded view of a display apparatus, according to an embodiment of the disclosure.
Figure 3:
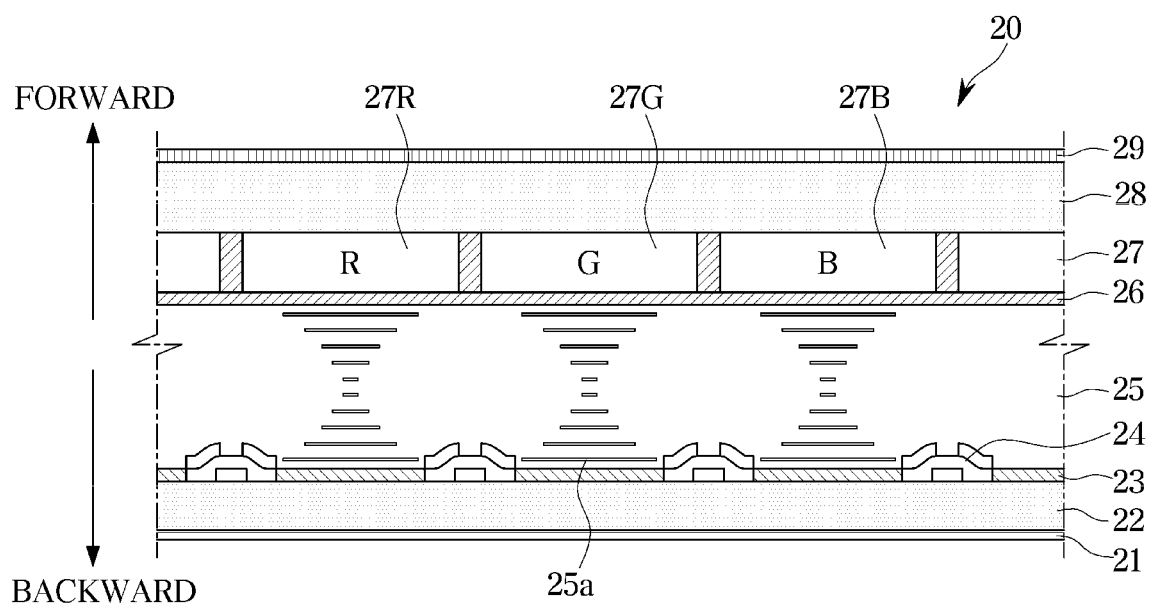
FIG. 3 illustrates a liquid crystal panel of a display apparatus, according to an embodiment of the disclosure.

FIG. 2 is an exploded view of a display apparatus, according to an embodiment of the disclosure. FIG. 3 illustrates a liquid crystal panel of a display apparatus, according to an embodiment of the disclosure.

Referring to FIG. 2, many different kinds of components to produce the image I on the screen 12 may be equipped in the main body 11. For example, a backlight unit 100—a surface light source, a liquid crystal panel 20 for blocking or passing the light emitted from the backlight unit 100, a control assembly 50 for controlling operations of the backlight unit 100 and the liquid crystal panel 20, and a power assembly 60 for supplying power to the backlight unit 100 and the liquid crystal panel 20 are equipped in the may body 11.

The main body 11 may include a bezel 13, a frame middle mold 14, and a rear cover 16. The bezel 13, the frame middle mold 14 and the rear cover 16 may support and fix the liquid crystal panel 20, the backlight unit 100, the control assembly 50 and the power assembly 60.

The backlight unit 100 may include point light sources for emitting monochromatic light or white light, and refract, reflect, and diffuse the light emitted from the point light sources to convert the light to uniform surface light. In this way, the backlight unit 100 may emit the uniform surface light in a forward direction by refracting, reflecting and diffusing the light emitted from the point light sources. The backlight unit 100 will now be described in more detail.

The liquid crystal panel 20 may be arranged in front of the backlight unit 100 for blocking or passing the light emitted from the backlight unit 100 to produce the image I. The front surface of the liquid crystal panel 20 may form the screen 12 of the aforementioned display apparatus 10, and the liquid crystal panel 20 may include the plurality of pixels P. The plurality of pixels P of the liquid crystal panel 20 may each separately block or pass the light from the backlight unit 100, and the light having passed the plurality of pixels P forms the image I to be displayed on the screen 12. The plurality of pixels P may be arranged in the form of a matrix. In other words, the plurality of pixels P may be arranged in a plurality of rows and a plurality of columns.

Referring to FIG. 3, the liquid crystal panel 20 may include a first polarizer film 21, a first transparent substrate 22, a pixel electrode 23, a thin film transistor ("TFT") 24, a liquid crystal layer 25, a common electrode 26, a color filter 27, a second transparent substrate 28, and a second polarizer film 29.

The first transparent substrate 22 and the second transparent substrate 28 may fix and support the pixel electrode 23, the TFT 24, the liquid crystal layer 25, the common electrode 26, and the color filter 27. The first and second transparent substrates 22 and 28 may be formed of tempered glass or transparent resin.

The first polarizer film 21 and the second polarizer film 29 are arranged on outer sides of the first and second transparent substrates 22 and 28. The first and second polarizer films 21 and 29 may each pass particularly polarized light while blocking the other polarized light. For example, the first polarizer film 21 may pass polarized light of a first direction while blocking the other polarized light. Furthermore, the second polarizer film 29 may pass polarized light of a second direction while blocking the other polarized light. The first and second directions may be perpendicular to each other. As a result, the polarized light that has passed the first polarizer film 21 may not pass the second polarizer film 29.

The color filter 27 may be arranged on the inner side of the second transparent substrate 28. The color filter 27 may include a red color filter 27R for passing red light, a green color filter 27G for passing green light, and a blue color filter 27B for passing blue light. The red, green, and blue color filters 27R, 27G, and 27B may be arranged side by side. An area in which the color filter 27 may be formed may correspond to the pixel P as described above. An area where the red color filter 27R may be formed may correspond to the red subpixel $P_R$; an area where the green color filter 27G may be formed may correspond to the green subpixel $P_G$; an area where the blue color filter 27B may be formed may correspond to the blue subpixel $P_B$.

The pixel electrode 23 may be arranged on the inner side of the first transparent substrate 22, and the common electrode 26 may be arranged on the inner side of the second transparent substrate 28. The pixel electrode 23 and the common electrode 26 are formed of an electrically conductive metal material, and may produce an electric field to change arrangement of liquid crystal molecules 115a that form the liquid crystal layer 25.

The TFT 24 may be arranged on the inner side of the second transparent substrate 22. The TFT 24 may pass or block the current flowing in the pixel electrode 23. For example, depending on whether the TFT 24 may be turned on (closed) or turned off (opened), an electric field may be formed or removed from between the pixel electrode 23 and the common electrode 26.

The liquid crystal layer 25 may be formed between the pixel electrode 23 and the common electrode 26 and filled with liquid crystal molecules 25a. The liquid crystals are in an intermediate state between solid (crystal) and fluid. The liquid crystals reveal an optical property according to a change in electric field. For example, the liquid crystal may have varying directions of arrangement of molecules that form the liquid crystal, according to a change in electric field. The optical property of the liquid crystal layer 25 may be changed according to whether there may be an electric field passing through the liquid crystal layer 25.

Turning back to FIG. 2, a cable 20a for transmitting image data to the liquid crystal panel 20 and a display driver integrated circuit ("DDI") 30 (hereinafter, called a 'panel driver') for processing digital image data to output an analog image signal may be provided on one side of the liquid crystal panel 20.

The cable 20a may electrically connect the panel driver 30 to the control assembly 50 and the power assembly 60. The cable 20a may also electrically connect the panel driver 30 to the liquid crystal panel 20. The cable 20a may include a flexible flat cable or a film cable, which may be bendable.

The panel driver 30 may receive image data from the control assembly 50 and power from the power assembly 60 through the cable 20a. The panel driver 30 may also provide image data and a driving current to the liquid crystal panel 20 through the cable 20a.

The cable 20a and the panel driver 30 may be integrally formed. For example, the cable 20a and the panel driver 30 may be a chip on film ("COF") or a tape carrier package (TCP). In other words, the panel driver 30 may be arranged on the cable 20a. It is not, however, limited thereto, and the panel driver 30 may be arranged on the liquid crystal panel 20.

The control assembly 50 may include a control circuit for controlling operations of the liquid crystal panel 20 and the backlight unit 100. The control circuit may process image data received from an external content source, transmit image data to the liquid crystal panel 20, and transmit dimming data to the backlight unit 100. The control assembly 50 may include a processor 91 and a memory 92.

The power assembly 60 may supply power to the liquid crystal panel 20 and the backlight unit 100. The liquid crystal panel 20 may use the power supplied to block or pass the light emitted from the backlight unit 100. The backlight unit 100 may emit light by using the power supplied.

The control assembly 50 and the power assembly 60 may be one or more printed circuit boards (PCBs) and various circuits mounted on the PCBs. For example, the control assembly 50 may include a control circuit board on which the processor 91 and the memory 92 are mounted. The power assembly 60 may include a power circuit board on which components such as a capacitor, a coil, a resistor and a processor are mounted.

Figure 4:
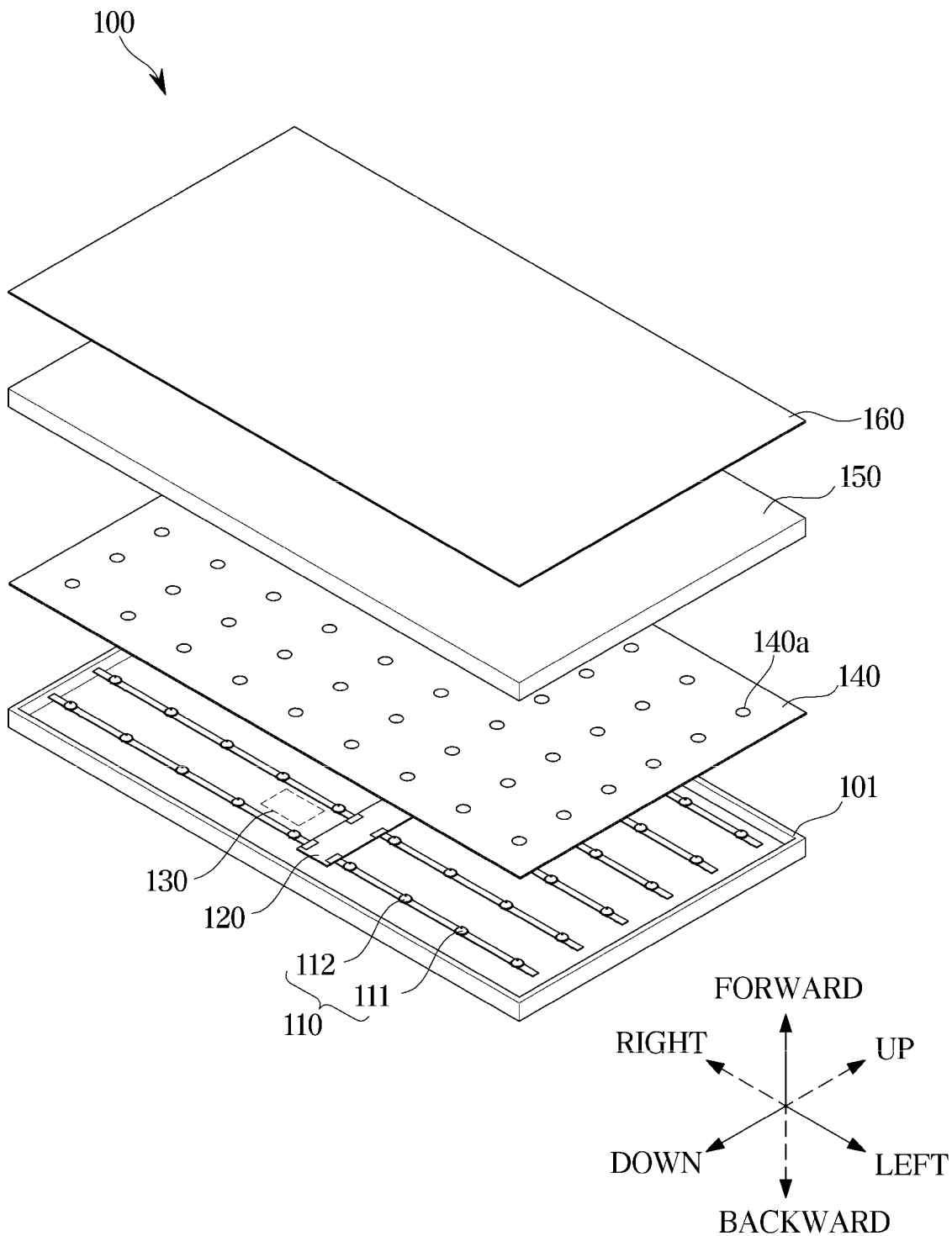
FIG. 4 is an exploded view of a backlight unit, according to an embodiment of the disclosure.

FIG. 4 is an exploded view of a backlight unit, according to an embodiment of the disclosure.

Referring to FIG. 4, the backlight unit 100 may include a bottom chassis 101, a plurality of light source modules 110, a first interface board 120, a second interface board 130, a reflection sheet 140, a diffuser plate 150 and an optical sheet 160.

The bottom chassis 101 may have a size matching the frame middle mold 14 and/or the rear cover 16, and may have a flat plate shape. The bottom chassis 101 may be arranged at the tail of the backlight unit 100. The bottom chassis 101 may support the plurality of light source modules 110, the first interface board 120 and the second interface board 130. Furthermore, the bottom chassis 101 may also support the control assembly 50 and the power assembly 60 as described in FIG. 2.

The plurality of light source modules 110 may be located on the front surface of the bottom chassis 101 to produce light. The plurality of light source modules 110 may be arranged at predetermined intervals. Furthermore, each of the light source modules 110 may be arranged to be perpendicular to the first interface board 120. For example, when the first interface board 120 is arranged in the vertical direction, the light source modules 110 may be arranged at predetermined intervals in the horizontal (left-right) direction, and the plurality of light source modules 110 may be parallel to each other.

The plurality of light source modules 110 may each have a bar shape. With the application of the bar-type light source modules 110 to the backlight unit 100, the number of light sources 111 may be reduced. As the number of light sources 111 is reduced as compared to the existing technology having a plate-shaped light source module, error rates in the backlight unit 100 may be reduced, the productivity may be improved, and repair of the backlight unit 100 may become easy. Even with the decrease in the number of light sources 111, high brightness and a high contrast ratio may be secured by controlling the driving current applied to the light sources 111.

The first interface board 120 may be located on the front surface of the bottom chassis 101 and connected to the plurality of light source modules 110. The second interface board 130 may be located on the rear surface of the bottom chassis 101 (shown in dotted lines) and connected to the first interface board 120. The second interface board 130 may receive dimming data from the processor 91. Arrangement of the second interface board 130 on the rear surface of the bottom chassis 101 may prevent empty space created between the first interface board 120 and the bottom chassis 101. Accordingly, thickness of the backlight unit 100 may be reduced. Efficient wiring may also be enabled. The current supplied from the power assembly 60 may be provided to the plurality of light source modules 110 through the first interface board 120 and/or the second interface board 130.

The plurality of light source modules 110 may each include a plurality of light sources 111 for emitting light, and a substrate 112 on which the plurality of light sources 111 are mounted. The plurality of light sources 111 may be arranged in predefined arrangement to emit light with uniform brightness. For example, the plurality of light sources 111 may be arranged such that a light source is equidistant from its neighboring light sources. The plurality of light sources 111 may be arranged equidistantly, arranged in zigzags, or arranged to make a plurality of columns and/or rows.

The reflection sheet 140 may reflect light emitted from the plurality of light sources 111 to a forward direction or to a nearly forward direction. The reflection sheet 140 may include a plurality of through holes 140a formed at positions respectively matching the plurality of light sources 111 of the light source modules 110. Furthermore, the light sources 111 of the light source modules 110 may pass the through holes 140a and protrude forward from the reflection sheet 140. The plurality of light sources 111 may emit light forward from the reflection sheet 140. The reflection sheet 140 may reflect light emitted from the plurality of light sources 111 toward the diffuser plate 150.

The diffuser plate 150 may be arranged in front of the light source modules 110 and the reflecting sheet 140 to uniformly diffuse the light emitted from the light sources 111 of the light source modules 110. To avoid the non-uniformity in brightness caused by the plurality of light sources 111, the diffuser plate 150 may diffuse the light emitted from the plurality of light sources 111 within the diffuser plate 150. In other words, the diffuser plate 150 may emit uniform light forward.

The optical sheet 160 may include various sheets to improve brightness and uniformity in brightness. For example, the optical sheet 160 may include a diffuser sheet, a prism sheet, and a reflective polarizer sheet. In addition, the optical sheet 160 may further include a protective sheet and other various sheets or films.

Figure 5:
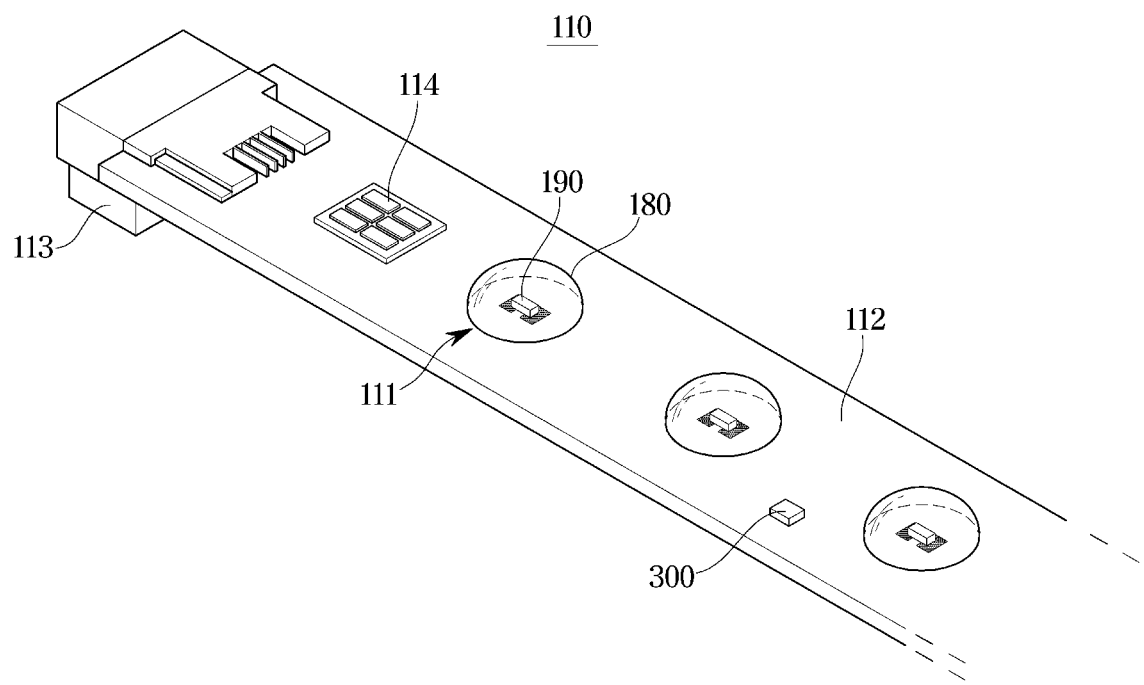
FIGS. 5, 6, and 7 illustrate light source modules, according to various embodiments of the disclosure.
Figure 6:
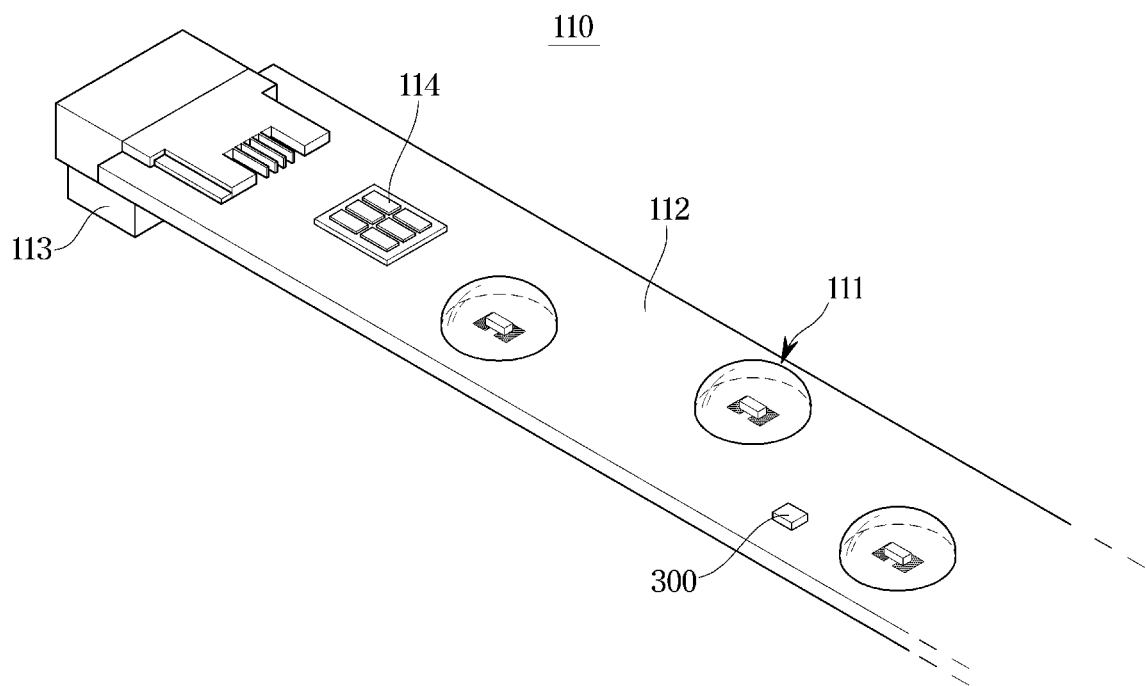
Figure 7:
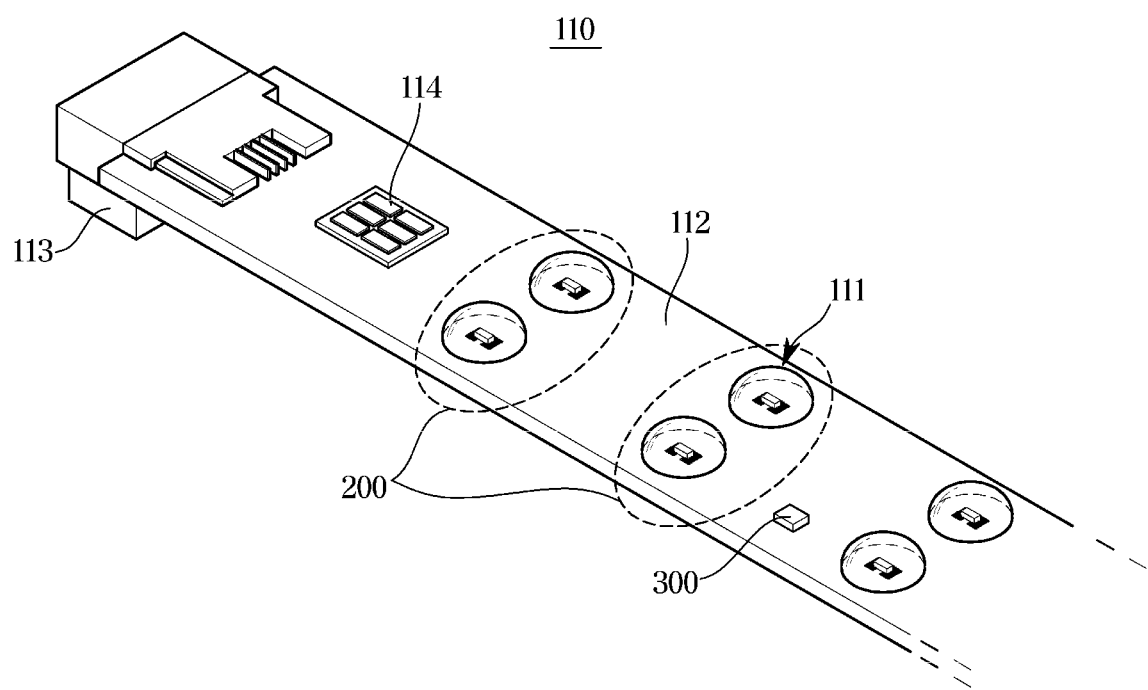

FIGS. 5, 6, and 7 illustrate light source modules, according to various embodiments of the disclosure.

Referring to FIGS. 5, 6, and 7, the light source modules 110 may include a plurality of light sources 111 and a substrate 112 on which the light sources 111 are mounted. The plurality of light sources 111 may be mounted on the front surface of the substrate 112. The plurality of light sources 111 may be arranged on the substrate in predetermined arrangement. For example, the plurality of light sources 111 may be arranged such that a light source may be equidistant from its neighboring light sources.

As shown in FIG. 5, the plurality of light sources 111 may be equidistantly arranged in a line. Furthermore, as shown in FIG. 6, the plurality of light sources 111 may be arranged in zigzags. Moreover, as shown in FIG. 7, the plurality of light sources 111 may be arranged in a plurality of rows and/or columns. In FIG. 7, the plurality of light sources 111 are illustrated as being arranged in two lines. Besides, there may be various patterns and/or forms in which the plurality of light sources 111 are arranged.

The substrate 112 may secure the plurality of light sources 111. In addition, the substrate 112 may supply power to each of the light sources 111 so that each of the light sources 111 may emit light. The substrate 112 may be formed of a synthetic resin, tapered glass or a PCB with conductive lines formed therein.

The light sources 111 may employ devices capable of emitting monochromatic light (light having a particular wavelength, e.g., blue light) or white light (mixed light of red light, green light, and blue light) to various directions when powered. The light source of the light sources 111 may include an LED 190 and an optical dome 180.

The optical dome 180 may cover the LED 190. The optical dome 180 may prevent or suppress damage to the LED 190 due to an external mechanical action and/or chemical action. The optical dome 180 may be formed of silicon or epoxy resin. For example, melted silicon or epoxy resin may be applied onto the LED 190 and then hardened to form the optical dome 180.

The optical dome 180 may have various forms. For example, the optical dome 180 may be shaped like a dome or a semi-sphere cut from a sphere. A vertical cross-section of the optical dome 180 may have an arcuate form or a semi-circular form. Depending on viscosity of the fluid silicon or epoxy resin, the shape of the optical dome 180 may be variously changed. When the optical dome 180 is manufactured with silicon with a thixotropic index of about 2.7 to 3.3 (preferably 3.0), the optical dome 180 having a dome ratio of about 0.25 to 0.31 (preferably 0.28) representing a ratio of dome height to a diameter of the bottom side of the dome (dome height/diameter of the bottom side) may be formed. The optical dome 180 manufactured with the silicon having the thixotropic index of about 2.7 to 3.3 (preferably 3.0) may have a diameter of the bottom side of about 2.5 mm and height of about 0.7 mm.

The optical dome 180 may be optically transparent or translucent. Light emitted from the LED 190 may pass through the optical dome 180 to the outside. The optical dome 180 may refract the light like a lens. The light emitted from the LED 190 may be refracted and dispersed by the optical dome 180. Hence, the optical dome 180 may not only protect the LED 190 from an external mechanical action and/or chemical action or electrical action, but also scatter the light emitted from the LED 190.

The backlight unit 100 may be made to be thin to make the display apparatus 10 thin. To make the backlight unit 100 thin, the plurality of light sources 111 may have a small size and simple structure.

The LED 190 may be attached directly to the substrate 112 in a method of chip on board (COB). A light source of the light sources 111 may include the LED 190 with an LED chip or an LED die attached directly to the substrate 112. Furthermore, the LED 190 may be manufactured in a flip chip type. The LED 190 of the flip chip type may not use an intermediate medium such as a metal lead (wire) or a ball grid array ("BGA") to attach the LED, which may be a semiconductor device, to the substrate 112, but may fuse an electrode pattern of the semiconductor device onto the substrate 112 as it is. This enables making smaller light sources 111 including the LED 190 of the flip chip type by omitting the metal lead (wire) or the ball grid array.

The light source modules 110 may include a connector 113 in a portion of the substrate 112 to couple the first interface bard 120 to the substrate 112. In other words, the light source modules 110 may be coupled to or decoupled from the first interface board by the connector 113. The fact that the light source modules 110 may be easily coupled to or decoupled from the first interface board 120 may make it easy to replace and/or repair the light source modules 110 when an error occurs to the light source modules 110.

For example, the connector 113 may be arranged at one end of the substrate 112. The first interface board 120 may have a plurality of first terminals 121 to which the plurality of light source modules 110 are coupled. The connector 113 may include a plurality of pins (not shown) for transmitting signals and/or data between the light source modules 110 and the first interface board 120. The connector 113 provided on the substrate 112 of the light source modules 110 may be called a male connector, and the first terminals 121 of the first interface board 120 may be called a female connector.

The light source modules 110 may include one or more driving devices 300 for driving the plurality of light sources 111. The driving devices 300 may be a pixel integrated circuit ("pixel IC") or an active matrix integrated circuit ("AM IC"). The driving device 300 may be mounted on the front surface or the rear surface of the substrate 112. The plurality of light sources 111 may be grouped into a plurality of dimming blocks 200 including at least one light source 111. The driving device 300 may control the plurality of dimming blocks 200.

One or more driving devices 300 may be mounted on the substrate 112 of the light source modules 110. The plurality of driving devices 300 may be arranged on the substrate 112 in various arrangements. For example, the plurality of driving devices 300 may be arranged equidistantly or in zigzags. Relative positions of the driving devices 300 may differ in different light source modules 110.

Furthermore, the light source modules 110 may include a protection circuit 114 to protect the plurality of light sources 111 and the driving device 300. The protection circuit 114 may be mounted on the front surface or the rear surface of the substrate 112. In addition, the light source modules 110 may include other various devices.

Figure 8:
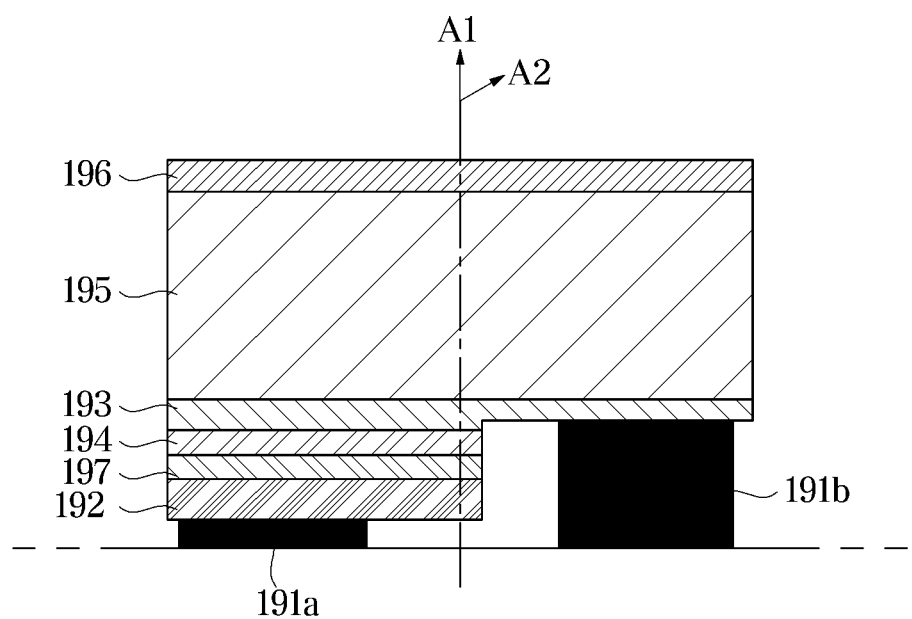
FIG. 8 illustrates a light-emitting diode ("LED") mounted on a light source module, according to an embodiment of the disclosure.

FIG. 8 illustrates an LED mounted on a light source module, according to an embodiment of the disclosure.

Referring to FIG. 8, the LED 190 may include a transparent substrate 195, an n-type semiconductor layer (e.g., n-type gallium nitride (n-type GaN)) 193 and a p-type semiconductor layer (e.g., p-type Gan) 192. A multi quantum wells (MQW) layer 194 and an electron-blocking layer (EBL) 197 may be formed between the n-type semiconductor layer 193 and the p-type semiconductor layer 192. When a current may be applied to the LED 190, electrons and holes may be re-coupled in the MQW layer 194, thereby emitting light.

A first electrode 191a of the LED 190 electrically contacts the p-type semiconductor layer 192, and a second electrode 191b electrically contacts the n-type semiconductor layer 193. The first electrode 191a and the second electrode 191b may serve not only as electrodes but also as reflectors that reflect light.

The LED 190 may be a distributed Bragg reflector (DBR) LED including a DBR. A DBR layer 196 may be arranged on the outer side of the transparent substrate 195. The DBR layer 196 may be formed by stacking up materials with different refractive indexes, and the DBR layer 196 may reflect incident light. As the DBR layer 196 may be arranged on the outer side (upper side in the drawing) of the transparent substrate 195, light entering to the DBR layer 196 at a right angle may be reflected by the DBR layer 196. Accordingly, the intensity of light emitted in a direction A1 perpendicular to the DBR layer 196 (in the upper direction of the LED in the drawing) may be lower than the intensity of light emitted in a direction A2 slanted from the DBR layer 196 (e.g., a direction slanted from the upper direction in the drawing at about 60 degrees). In other words, the LED 190 may emit more intense light in a lateral direction than in the perpendicular direction.

Figure 9:
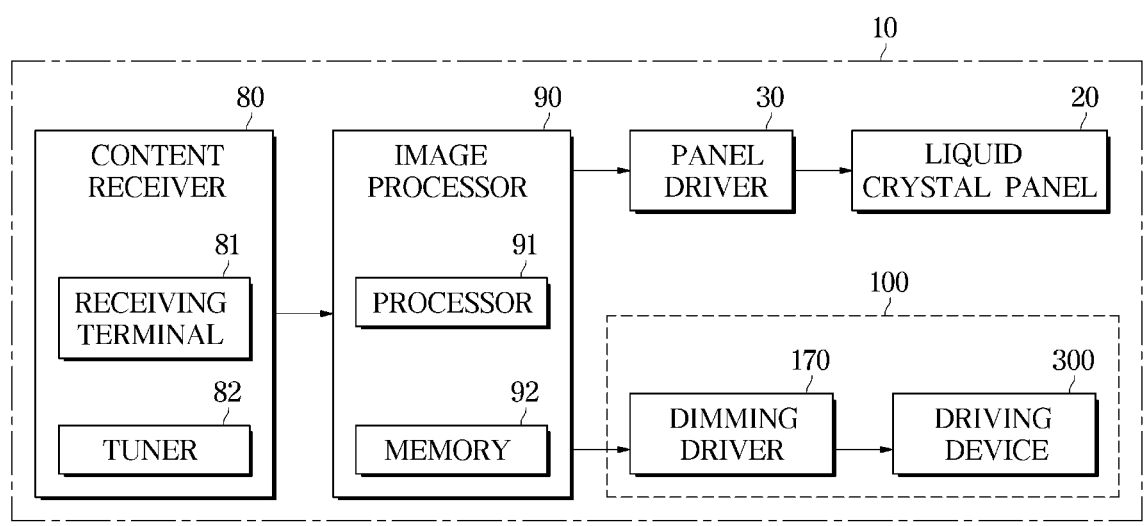
FIG. 9 is a block diagram of a display apparatus, according to an embodiment of the disclosure.

FIG. 9 is a block diagram of a display apparatus, according to an embodiment of the disclosure.

Referring to FIG. 9, the display apparatus 10 may include a content receiver 80, the image processor 90, the panel driver 30, the liquid crystal panel 20, a dimming driver 170, and the driving device 300. The dimming driver 170 and the driving device 300 may be included in the backlight unit 100.

The content receiver 80 may include a receiving terminal 81 and a tuner 82 for receiving content data including video signals and/or audio signals from content sources. The content receiver 80 may receive video signals and audio signals from the content sources, and output the video signals and/or audio signals received through the receiving terminals 81 and/or the tuner 82 to the image processor 90.

The receiving terminals 81 may receive video signals and audio signals from the content sources through a cable. For example, the receiving terminals 81 may include various kinds of terminals such as a component (YPbPr/RGB) terminal, a composite video blanking and sync (CVBS) terminal, an audio terminal, a high definition multimedia interface (HDMI) terminal, and a universal serial bus (USB) terminal.

The tuner 82 may receive broadcast signals through a broadcast receiving antenna or a cable, and extract a broadcast signal on a channel selected by the user from among the received broadcast signals. For example, the tuner 82 may pass a broadcast signal having a frequency corresponding to a channel selected by the user among the plurality of broadcast signals received through the broadcast receiving antenna or the cable, and block the other broadcast signals having different frequencies.

The image processor 90 may include a processor 91 for processing image data and a memory 92 for memorizing/storing data.

The memory 92 may store a program, data, instructions, software and/or an application for processing video signals and/or audio signals. The memory 92 may temporarily store data occurring in processing the video signals and/or audio signals. The memory 92 may include a non-volatile memory, such as a read only memory (ROM) and a flash memory, and a volatile memory, such as a static random access memory (SRAM) and a dynamic RAM (DRAM).

The processor 91 may decode the video signal and/or audio signal received from the content receiver 80 to image data. The processor 91 may also create dimming data from the image data. The image data may be output to the panel driver 30, and the dimming data may be output to the dimming driver 170.

The display apparatus 10 may be configured to perform an operation to enhance a contrast ratio of the image. As described above, the backlight unit 100 may include the plurality of light sources 111, and diffuse light emitted from the plurality of light sources 111 to output surface light. The liquid crystal panel 20 may include a plurality of pixels, and the panel driver 30 may control the plurality of pixels each to pass or block light. Light that has passed the plurality of pixels may form an image.

The display apparatus 10 may turn off light sources of the backlight unit 100 corresponding to a dark portion of an image to further darken the dark portions of the image. Accordingly, the contrast ratio of the image may be enhanced. The operation performed by the display apparatus 10 to control the backlight unit 100 not to emit light from portions corresponding to the dark portions of the image is called "local dimming".

For local dimming, the plurality of light sources 111 included in the light source modules 110 may be classified into a plurality of dimming blocks 200. For example, the number of dimming blocks 200 may be 700 or more. Each of the plurality of dimming blocks 200 may include at least one light source 111. One dimming block may include two or more neighboring light sources 111.

The driving device 300 may control and/or determine an amount of current to be applied to the plurality of dimming blocks 200 based on the dimming signal sent from the dimming driver 170. For example, based on the dimming signal, the same driving current may be applied to the light sources 111 belonging to the same dimming block. Accordingly, the light sources 111 belonging to the same dimming block may each emit light of uniform brightness.

Furthermore, based on the dimming signal, different driving currents may be applied to the light sources 111 belonging to the different dimming blocks. Accordingly, the light sources 111 belonging to the different dimming blocks may each emit light of different brightness.

The plurality of dimming blocks 200 may be divided into a plurality of groups. For example, four of the dimming blocks may define one group. The driving device 300 may control a plurality of dimming blocks included in one group. The light source modules 110 may include a plurality of driving devices 300, and each of the plurality of driving devices 300 may control the dimming blocks included in a different group.

The processor 91 may provide dimming data for local dimming to the dimming driver 170 of the backlight unit 100. The dimming data may include information about brightness of each of the plurality of dimming blocks. The dimming data may include information regarding intensity of light output from the light sources 111 included in each of the plurality of dimming blocks.

The processor 91 may obtain dimming data from image data decoded from a video signal. The processor 91 may convert the image data to the dimming data in various methods. For example, the processor 91 may partition the image I from the image data into a plurality of image blocks. The number of the plurality of image blocks may be the same as the number of the plurality of dimming blocks 200, and the plurality of image blocks may correspond to the plurality of dimming blocks 200, respectively.

The processor 91 may obtain brightness values of the plurality of dimming blocks 200 from the image data of the plurality of image blocks. Furthermore, the processor 91 may create dimming data by combining the brightness values of the plurality of dimming blocks 200.

For example, the processor 91 may obtain the brightness value of each of the plurality of dimming blocks 200 based on a maximum value of brightness of pixels included in each image block. An image block may include a plurality of pixels, and image data of an image block may include image data of the plurality of pixels (e.g., red data, green data, and blue data). The processor 91 may calculate a brightness value of each of the pixels based on image data of the pixel.

The processor 91 may determine a maximum value of brightness of pixels included in an image block as a brightness value of a dimming block corresponding to the image block. For example, the processor 91 may determine a maximum value of brightness of pixels included in an i-th image block as a brightness value of an i-th dimming block, and determine a maximum value of brightness of pixels included in a j-th image block as a brightness value of a j-th dimming block.

The panel driver 30 may receive image data from the image processor 90, and drive the liquid crystal panel 20 based on the image data. The panel driver 30 may convert the image data, which may be a digital signal, to an image signal, which may be an analog voltage signal, and provide the converted image signal to the liquid crystal panel 20.

According to the image signal, an optical property (e.g., light transmittance) of the plurality of pixels P included in the liquid crystal panel 20 may be changed.

The panel driver 30 may include a timing controller, a data driver and a scan driver. The timing controller may receive image data from the image processor 90, and output the image data and a driving control signal to the data driver and the scan driver. The driving control signal may include a scan control signal and a data control signal. The scan control signal may be used to control the operation of the scan driver, and the data control signal may be used to control the operation of the data driver.

The scan driver may receive the scan control signal from the timing controller, and based on the scan control signal, input-activate pixels belonging to a row among pixels of the liquid crystal panel 20 arranged in a matrix form. The input-activated pixels are in a state of being able to receive image signals. Input-deactivated pixels other than the pixels input-activated by the scan driver are unable to receive image signals.

The data driver may receive image data and a data control signal from the timing controller, and output image data to the liquid crystal panel 20 based on the data control signal. For example, the data driver may receive image data from the timing controller, and convert the digital image data to an analog image signal.

Furthermore, the data driver may provide the image signal to the pixels included in a row input-activated by the scan driver. The pixels input-activated by the scan driver receive the image signal, which makes an optical property (e.g., light transmittance) of the input-activated pixels changed. Accordingly, an image corresponding to the image data may be displayed on the liquid crystal panel 20.

The dimming driver 170 may receive dimming data from the image processor 90, and convert the dimming data to dimming signals for controlling the plurality of driving devices 300. The dimming driver 170 may provide the dimming signals to the respective driving devices 300. The dimming data may include information about brightness of each of the plurality of dimming blocks 200, and/or information about brightness of light sources 111 included in each of the plurality of dimming blocks 200.

The dimming driver 170 may convert digital dimming data to an analog dimming signal and provide the dimming signal to the driving device 300. Based on the dimming signal, the driving device 300 may control intensity of light emitted by the light sources 111 included in each of the plurality of dimming blocks 200. In other words, the driving device 300 may control an amount of current (the magnitude of a driving current) applied to the light sources 111 based on the dimming signal.

As the plurality of light source modules 110 are arranged, the plurality of light sources 111 may form a plurality of rows and a plurality of columns. In other words, the plurality of light sources 111 may form a matrix arrangement. The plurality of light sources 111 may be classified into the plurality of dimming blocks 200. Furthermore, the dimming blocks and the driving devices 300 may form a matrix arrangement.

The dimming driver 170 may provide dimming signals to the plurality of driving devices 300 in an active matrix method. In other words, the dimming signals may be provided to the dimming blocks 200 successively rather than all at once.

The dimming driver 170 may successively provide the dimming signals to the driving devices 300 belonging to the respective rows or provide the dimming signals to the driving devices 300 belonging to the respective columns. For example, the dimming driver 170 may input-activate the driving devices 300 belonging to a row and then provide the dimming signal to the input-activated driving devices 300. Subsequently, the dimming driver 170 may input-activate the driving devices 300 belonging to another row and then provide the dimming signal to the input-activated driving devices 300.

How the dimming driver 170 provides the dimming signals to the driving devices 300 in an active matrix method will now be described in detail.

Figure 10:
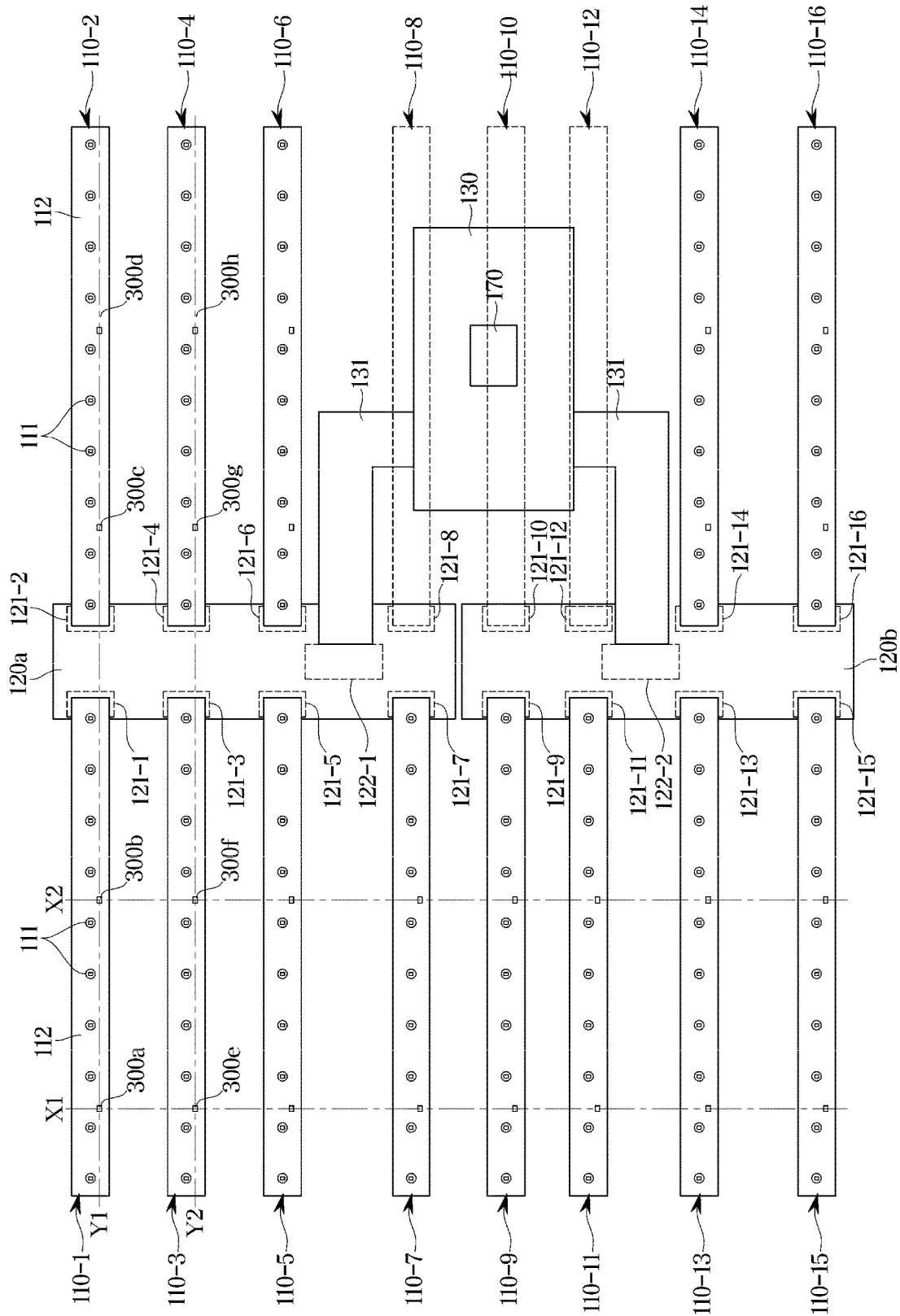
FIGS. 10, 11, and 12 illustrate arrangements of light source modules and interface boards, according to various embodiments of the disclosure.
Figure 11:
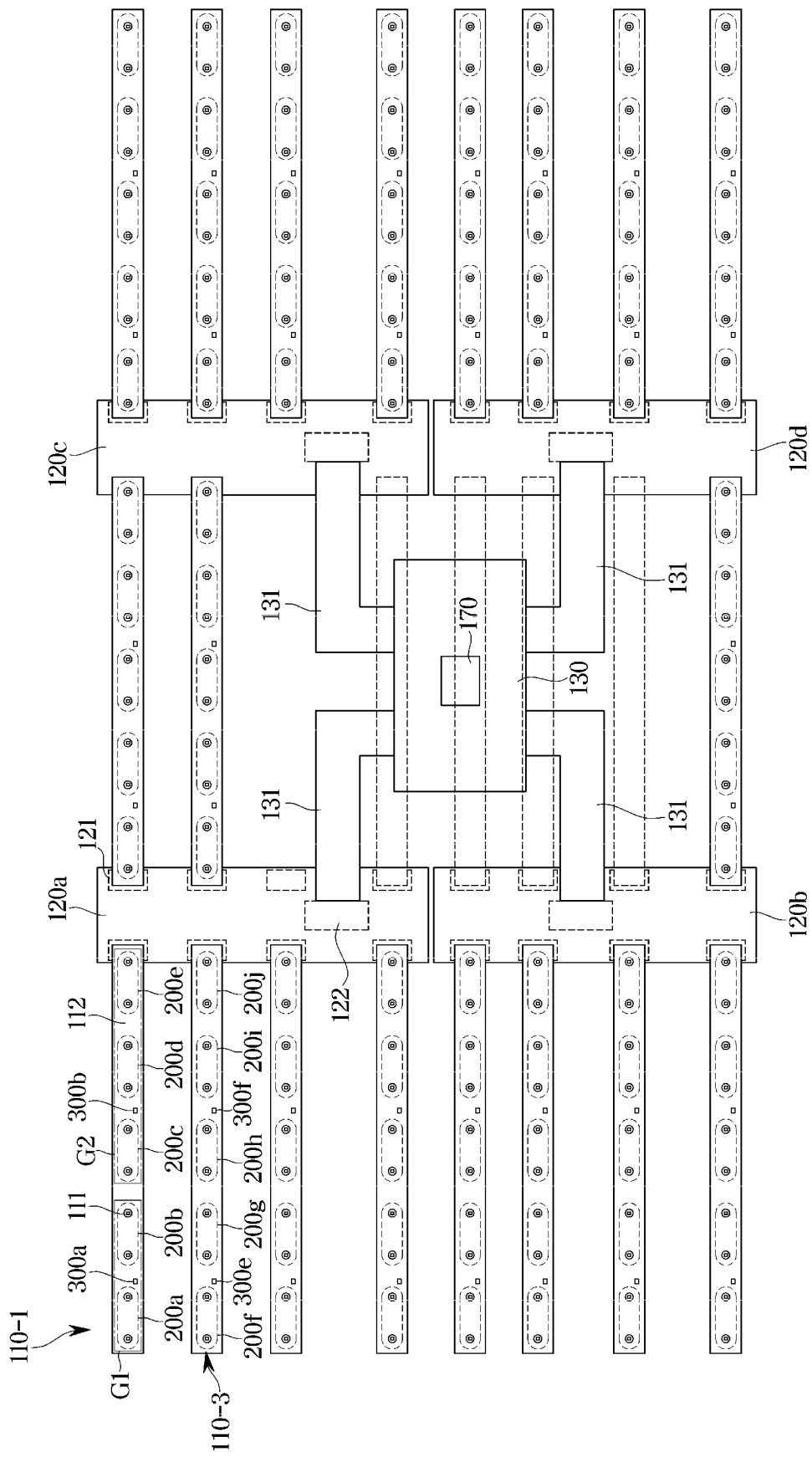
Figure 12:
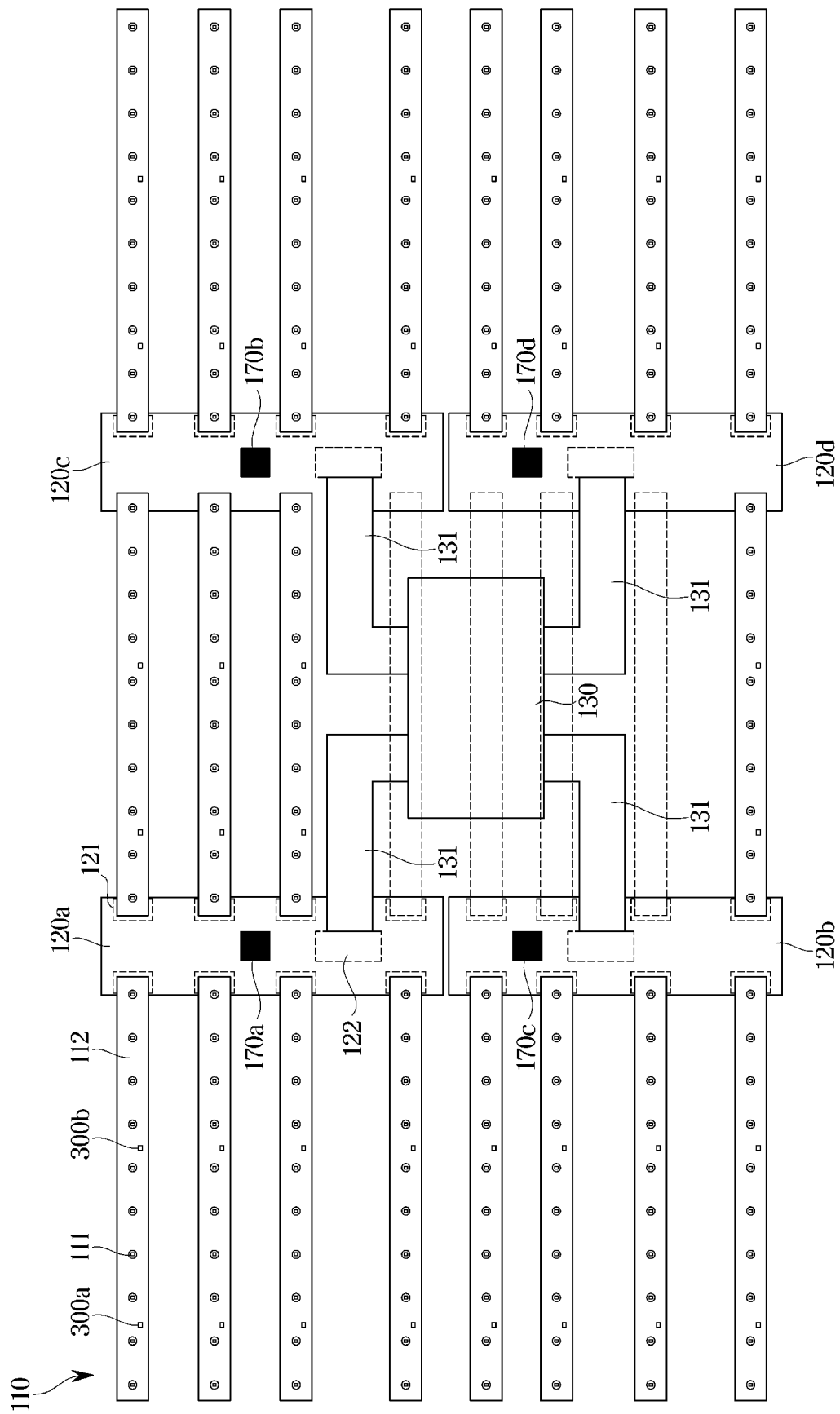

FIGS. 10, 11, and 12 illustrate arrangements of light source modules and interface boards, according to various embodiments of the disclosure.

In FIGS. 10, 11 and 12, the plurality of light source modules 110 and the first interface board 120 are located on the front surface of the bottom chassis 101, and the second interface board 130 may be located on the rear surface of the bottom chassis 101. Arrangement of the second interface board 130 on the rear surface of the bottom chassis 101 may prevent empty space created between the first interface board 120 and the bottom chassis 101. Accordingly, thickness of the backlight unit 100 may be reduced. The first interface board 120 and the second interface board 130 may be PCBs with conductive lines formed thereon. Furthermore, the second interface board 130 may include a field programmable gate array FPGA, which may be a semiconductor device.

As described above, each of the plurality of light source modules 110 may include a plurality of light sources 111 and a substrate 112. The substrate 112 may have at least one driving device 300 mounted thereon. For example, one light source modules 110 may include two driving devices 300. The driving device 300 may be mounted on the front surface or the rear surface of the substrate 112.

The plurality of light source modules 110 may be arranged at predetermined intervals. Each of the light source modules 110 may be arranged to be perpendicular to the first interface board 120. For example, when the first interface board 120 may be arranged in the vertical direction, the light source modules 110 may be arranged at predetermined intervals in the horizontal direction. The plurality of light source modules 110 may be parallel to one another.

As the plurality of light source modules 110 are arranged, the plurality of driving devices 300 may define a matrix arrangement. In other words, the plurality of driving devices 300 may define a plurality of rows and a plurality of columns. For example, the first to fourth driving devices 300*a*, 300*b*, 300*c*, and 300*d* may form a first row Y1. The fifth to eighth driving devices 300*e*, 300*f*, 300*g*, and 300*h* may form a second row Y2. Furthermore, the first and fifth driving devices 300*a* and 300*e* may form a first column X1, and the second and sixth driving devices 300*b* and 300*f* may form a second column X2.

As shown in FIG. 10, the sixteen light source modules 110 from the first light source module 110-1 to the sixteenth light source module 110-16 may be arranged side by side on left and right sides to the first interface board 120. As an example, eight light source modules (e.g., first light source module 110-1, third light source module 110-3, fifth light source module 110-5, seventh light source module 110-7, ninth light source module 110-9, eleventh light source module 110-11, thirteenth light source module 110-13, and fifteenth light source module 110-15) may be connected to the left side of the first interface board 120, and the other eight light source modules (e.g., second light source module 110-2, fourth light source module 110-4, sixth light source module 110-6, eighth light source module 110-8, tenth light source module 110-10, twelfth light source module 110-12, fourteenth light source module 110-14, and sixteenth light source module 110-16) may be connected to the right side of the first interface board 120. The form of arrangement of the plurality of light source modules 110 is merely an example and not limited thereto. The light source modules 110 may be arranged in various non-overlapping forms.

There may be at least one first interface board 120. When there are a plurality of first interface boards 120 provided, the first interface boards 120 may be arranged to be adjacent or distant from each other. In FIG. 10, two first interface boards 120a and 120b are shown as being adjacent in the same line.

In FIGS. 11 and 12, there are four first interface boards (e.g., first first interface board 120a, second first interface board 120b, third first interface board 120c, and fourth first interface board 120d) arranged. Some of the first interface board 120a and 120b may be arranged to be adjacent in one line, and the others 120c and 120d may be arranged to be adjacent in the other line. The first interface boards 120 arranged distantly may be parallel to each other. The form of arrangement of the first interface boards 120 is merely an example and not limited thereto.

The first interface board 120 may be connected to the plurality of light source modules 110. The first interface board 120 may include the plurality of first terminals 121 to be connected to the plurality of light source modules 110. Each of the plurality of first terminals 121 may be coupled to the connector 113 of each of the plurality of light source modules 110. The light sources 111 included in the plurality of light source modules 110 may be operated by the current applied through the first interface board 120.

For example, as shown in FIG. 10, there may be sixteen first terminals 121-1 to 121-16 corresponding to the sixteen light source modules (from the first light source module 110-1 to the sixteenth light source module 110-16). The eight light source modules (e.g., first first terminal 121-1, third first terminal 121-3, fifth first terminal 121-5, seventh first terminal 121-7, ninth first terminal 121-9, eleventh first terminal 121-11, thirteenth first terminal 121-13, and fifteenth first terminal 121-15) may be arranged in a row on the left side to the first interface board 120, and the other eight light source modules (e.g., second first terminal 121-2, fourth first terminal 121-4, sixth first terminal 121-6, eighth first terminal 121-8, tenth first terminal 121-10, twelfth first terminal 121-12, fourteenth first terminal 121-14, and sixteenth first terminal 121-16) may be arranged in a row on the right side to the first interface board 120.

Referring to FIGS. 11 and 12, shown are the first interface boards 120 (120a, 120b, 120c, and 120d) arranged to be spaced apart on left and right sides. The first interface boards 120a and 120b located on the left side may include the sixteen first terminals 121. The first interface boards 120c and 120d located on the right side may include the eight first terminals 121.

Accordingly, in FIGS. 11 and 12, the second light source module 110-2, fourth light source module 110-4, sixth light source module 110-6, eighth light source module 110-8, tenth light source module 110-10, twelfth light source module 110-12, fourteenth light source module 110-14, and sixteenth light source module 110-16 connected to the first interface boards 120a and 120b on the left may not be electrically connected to the first interface boards 120c and 120d on the right.

The second interface board 130 may be connected to the first interface board 120 through a connection line 131. The connection line 131 may electrically connect the first interface board 120 to the second interface board 130. The connection line 131 may pass through the bottom chassis 101. The connection line 131 may be a flexible flat cable or a film cable, which may be bendable. The first interface board 120 may include second terminals 122-1 and 122-2 to be connected to the connection line 131. Although not shown, the connection line 131 may include a connector.

The dimming driver 170 may be mounted on the first interface board 120 or the second interface board 130. The dimming driver 170 may be mounted on the upper surface or the lower surface of the first interface board 120 or on the upper surface or the lower surface of the second interface board 130. The second interface board 130 and the dimming driver 170 may each be provided in the plural.

In FIGS. 10 and 11, the dimming driver 170 may be mounted on the second interface board 130. In FIG. 12, the dimming driver 170 may be mounted on the first interface board 120, in which case, dimming drivers 170a to 170d may be mounted on the respective first interface boards 120a to 120d.

The second interface board 130 may forward data and/or a signal transmitted from the processor 91 to the first interface board 120. For example, in FIGS. 10 and 11, the second interface board 130 may forward dimming data transmitted from the processor 91 to the dimming driver 170. The dimming driver 170 may convert the dimming data to a dimming signal, and the second interface board 130 may forward the converted dimming signal to the first interface board 120. The first interface board 120 may forward the dimming signal to the driving device 300 of the light source modules 110, and the driving device 300 may control operations of the light sources 111 based on the dimming signal.

In FIG. 12, the second interface board 130 may forward the dimming data transmitted from the processor 91 to the dimming driver 170 mounted on the first interface board 120. The first interface board 120 may forward the dimming signal converted by the dimming driver 170 to the driving device 300.

Referring to FIG. 11, the plurality of light sources 111 included in the light source modules 110 may be classified into a plurality of dimming blocks. For example, light sources 111 included in the first light source module 110-1 may be classified into five dimming blocks, first dimming block 200a, second dimming block 200b, third dimming block 200c, fourth dimming block 200d, and fifth dimming block 200e. One dimming block may include two neighboring light sources 111. The number of the light sources 111 included in one dimming block and the number of dimming blocks are not limited thereto.

Furthermore, the plurality of dimming blocks may be divided into a plurality of groups G1 and G2. For example, as shown in FIG. 11, the first group G1 may include the first dimming block 200a and the second dimming block 200b, and the second group G2 may include the third dimming block 200c, the fourth dimming block 200d and the fifth dimming block 200e. In another example, four of the dimming blocks may define one group.

The light sources 111 belonging to one dimming block may be controlled by the same driving device 300. For example, the plurality of light sources 111 belonging to the first dimming block 200a may be controlled by the first driving device 300a. The light sources 111 belonging to the third dimming block may be controlled by the second driving device 300. The light sources 111 belonging to one dimming block may receive a driving current with the same magnitude and then emit light with the same intensity.

The driving device 300 may also control the plurality of dimming blocks included in one group. The plurality of driving devices 300 may control the dimming blocks included in different groups, respectively. For example, the first driving device 300*a* may control the first dimming block 200*a* and the second dimming block 200*b* included in the first group G1, and the second driving device 300*b* may control the third dimming block 200*c*, the fourth dimming block 200*d*, and the fifth dimming block 200*e* included in the second group G2.

The first light sources 111 of the first dimming block 200*a* and the second dimming block 200*b* belonging to the first group G1 may receive a driving current with the same magnitude, and then may emit light with the same intensity. The second light sources 111 of the third dimming block 200*c*, the fourth dimming block 200*d*, and the fifth dimming block 200*e* belonging to the second group G2 may receive a driving current with the same magnitude, and then may emit light with the same intensity.

Driving currents applied to the light sources 111 of the dimming blocks belonging to different groups may be different from each other. For example, a first driving current applied to the first light sources 111 of the first dimming block 200*a* and the second dimming block 200*b* belonging to the first group G1 may be different from a second driving current applied to the second light sources 111 of the third dimming block 200*c*, the fourth dimming block 200*d*, and the fifth dimming block 200*e* belonging to the second group G2.

The number of the dimming blocks included in one group may vary depending on the design. In other words, the number of the dimming blocks electrically connected to one driving device 300 may vary.

Figure 13:
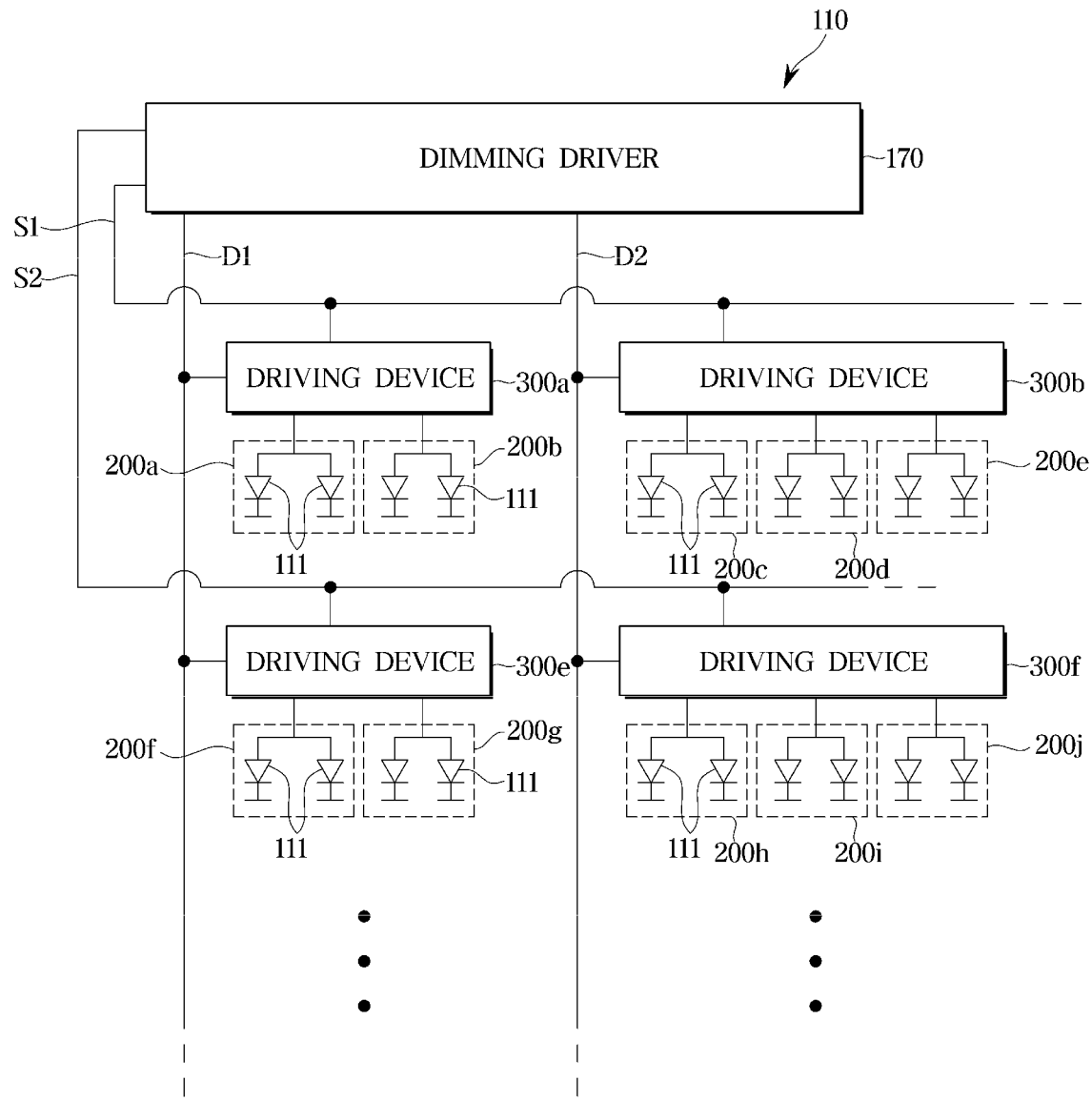
FIG. 13 illustrates connection between a dimming driver, driving devices, and dimming blocks, according to an embodiment of the disclosure.

FIG. 13 illustrates connection between a dimming driver, driving devices, and dimming blocks, according to an embodiment of the disclosure.

Referring to FIG. 13, the backlight unit 100 of the display apparatus 10 may include the dimming driver 170, the plurality of driving devices 300 and the plurality of light sources 111. The plurality of driving devices 300 may receive a dimming signal from the dimming driver 170, and based on the dimming signal, control the plurality of light sources 111.

Based on the dimming signal, the driving device 300 may control the light sources 111 included in the plurality of dimming blocks. For example, the first driving device 300*a* may control the light sources 111 belonging to the first dimming block 200*a* and second dimming block 200*b*. The second driving device 300*b* may control the light sources 111 belonging to the third dimming block 200*c*, fourth dimming block 200*d*, and fifth dimming block 200*e*. The driving device 300 may control an amount of current (the magnitude of a driving current) to be applied to the light sources 111 based on the dimming signal.

Some of the plurality of driving devices 300 may be input-activated by the dimming driver 170, may receive a dimming signal from the dimming driver 170 and may store the received dimming signal. Furthermore, among the plurality of driving devices 300, the input-activated driving devices 300 may control and/or determine a driving current to be applied to the light sources 111 based on the stored dimming signal.

There are a plurality of scan lines S1 and S2 for providing scan signals to the plurality of driving devices 300 from the dimming driver 170, and a plurality of data lines D1 and D2 for providing dimming signals to the plurality of driving devices 300 from the dimming driver 170.

The plurality of dimming blocks may define a plurality of rows and a plurality of columns. The driving devices 300 for controlling the light sources 111 of the dimming blocks belonging to the same row may share the same scan line. For example, the first and second driving devices 300*a* and 300*b* included in the first light source module 110-1 may share a first scan line S1. The fifth and sixth driving devices 300*e* and 300*f* included in the third light source module 110-3 may share a second scan line S1.

Furthermore, the driving devices 300 for controlling the light sources 111 of the dimming blocks belonging to the same column may share the same data line. For example, the first driving device 300*a* of the first light source module 110-1 and the fifth driving device 300*e* of the third light source module 110-3 may share a first data line D1. The second driving device 300*b* of the first light source module 110-1 and the sixth driving device 300*f* of the third light source module 110-3 may share a second data line D2.

The driving devices 300 may be input-activated by scan signals of the dimming driver 170, and may receive a dimming signal from the dimming driver 170. The dimming driver 170 may provide a scan signal to the driving devices 300 arranged in one of the plurality of rows and dimming signals to the driving devices 300 arranged in the plurality of columns. For example, while the dimming driver 170 may be outputting a scan signal through the first scan line S1, the first driving device 310*a* and the second driving device 300*b* may receive dimming signals through the first and second data lines D1 and D2, respectively. In this case, the fifth driving device 300*e* and the sixth driving device 300*f* do not receive the dimming signals.

While the dimming driver 170 may be outputting a scan signal through the second scan line S2, the fifth driving device 310*e* and the sixth driving device 300*f* may receive dimming signals through the first and second data lines D1 and D2, respectively. In this case, the first driving device 300*a* and the second driving device 300*b* do not receive the dimming signals.

On receiving the dimming signals, the plurality of driving devices 300 may store the received dimming signals and determine driving currents to be applied to the plurality of light sources 111 based on the stored dimming signals. For example, even while the dimming driver 170 may be outputting a scan signal through the first scan line S1, the fifth driving device 300*e* may operate the light sources 111 included in the sixth and seventh dimming blocks 200*f* and 200*g*, and the sixth driving device 300*f* may operate the light sources 111 included in the eighth, ninth, and tenth dimming blocks 200*h*, 200*i*, and 200*j*.

Furthermore, even while the dimming driver 170 may be outputting a scan signal through the second scan line S2, the first driving device 300*a* may operate the light sources 111 included in the first dimming block 200*a* and second dimming block 200*b*, and the second driving device 300*b* may operate the light sources 111 included in the third dimming block 200*c*, fourth dimming block 200*d*, and fifth dimming block 200*e*.

Based on the dimming signals, the driving devices 300 may control the light sources 111 belonging to the different dimming blocks to emit light with different intensities. For example, based on the dimming signals, the first driving device 300*a* may control a driving current to be applied to the first light sources 111 belonging to the first dimming block 200*a* to be the first driving current, and control a driving current to be applied to the second light sources 111 belonging to the second dimming block 200b to be the second driving current. The first driving current may be different from the second driving current.

According to this active matrix method based operation, the plurality of driving devices 300 may sequentially receive dimming signals from the dimming driver 170, and may operate the light sources 111 even while in an input-deactivated state in which no dimming signal may be received from the dimming driver 170.

Furthermore, according to the active matrix method based operation, the number of pins of the dimming driver 170 to provide dimming signals to the plurality of dimming blocks 300 may be reduced. Moreover, compared to the existing direct method in which the dimming driver 170 may be connected directly to the light sources 111, the number of signal lines connected to the dimming driver 170 may be reduced. In addition, one driving device 300 controls the plurality of dimming blocks, so that the number of the driving devices 300 may be reduced.

Figure 14:
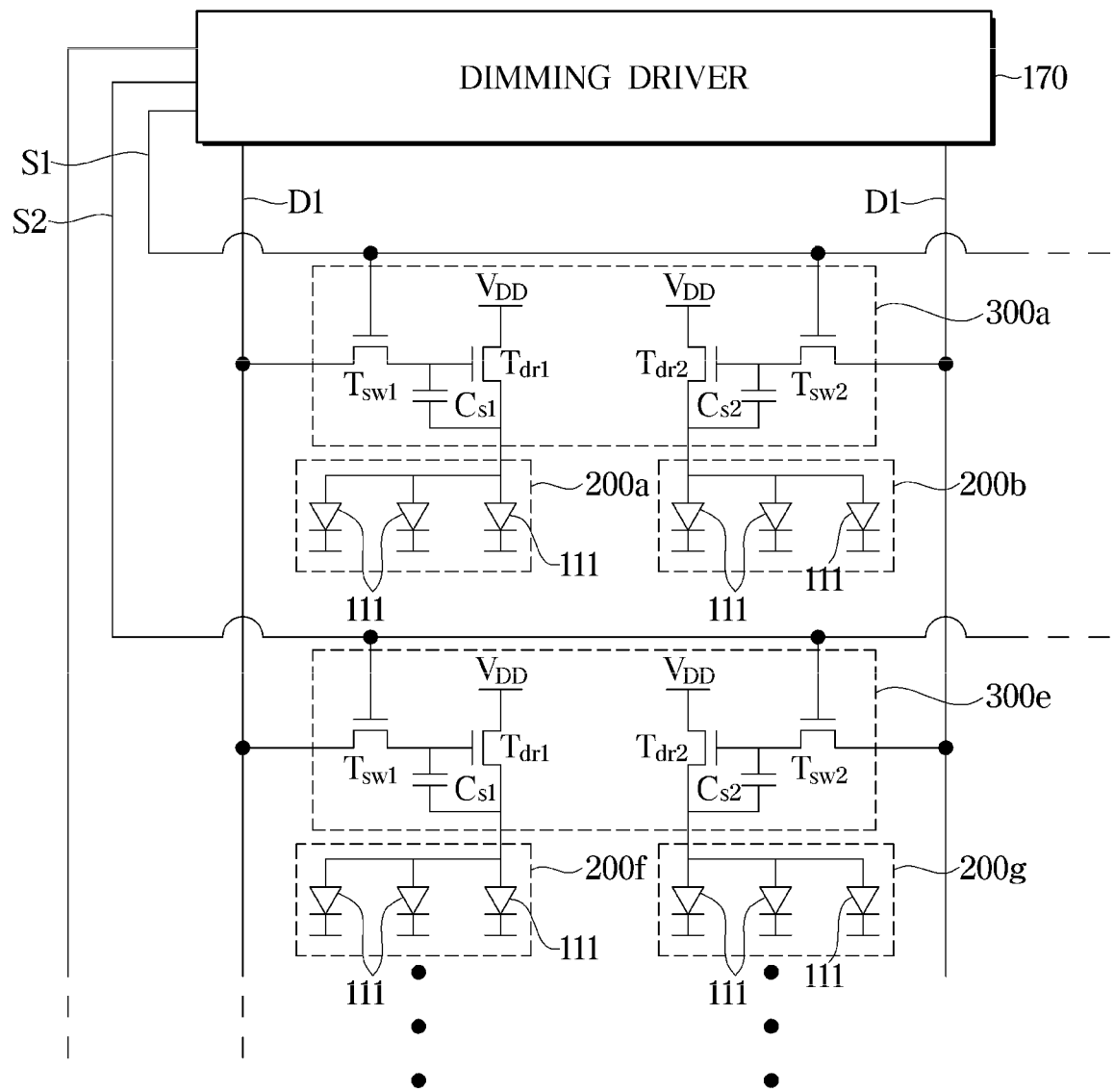
FIG. 14 illustrates an example of a driving device, according to an embodiment of the disclosure.

FIG. 14 illustrates an example of a driving device, according to an embodiment of the disclosure.

Referring to FIG. 14, the driving device 300 may include various topology circuits configured to perform the active matrix method based operation. For example, the driving device 300 may include a one-capacitor two-transistor (1C2T) topology circuit.

The driving device 300 may include a driving transistor Tdr, a switching transistor Tsw, and a storage capacitor Cs. The number of each of the driving transistors Tdr, the switching transistors Tsw, and the storage capacitors Cs included in one driving device 300 may be determined to correspond to the number of the dimming blocks controlled by the one driving device 300.

For example, the first and fifth driving devices 300a and 300e for controlling two of the dimming blocks may each include a first driving transistor Tdr1, a first switching transistor Tsw1, a first storage capacitor Cs1, a second driving transistor Tdr2, a second switching transistor Tsw2, and a second storage capacitor Cs2.

The first driving transistor Tdr1, the first switching transistor Tsw1, and the first storage capacitor Cs1 may operate the light sources 111 of a different dimming block from that of the second driving transistor Tdr2, the second switching transistor Tsw2, and the second storage capacitor Cs2. For example, the first driving transistor Tdr1, the first switching transistor Tsw1, and the first storage capacitor Cs1 included in the first driving device 300a may operate the light sources 111 of the first dimming block 200a. The second driving transistor Tdr2, the second switching transistor Tsw2, and the second storage capacitor Cs2 included in the first driving device 300a may operate the light sources 111 of the second dimming block 200b.

The driving transistor Tdr1 or Tdr2 includes an input terminal, an output terminal, and a control terminal. The input terminal of the driving transistor Tdr1 or Tdr2 may be connected to a power source Vdd, and the output terminal may be connected to the plurality of light sources 111. The driving transistor Tdr1 or Tdr2 may control the operation of the plurality of light sources 111 based on a voltage at the control terminal.

The storage capacitor Cs1 or Cs2 may be arranged between the output terminal and the control terminal of the driving transistor Tdr1 or Tdr2. The storage capacitor Cs1 or Cs2 may output a constant voltage by storing input charges. The driving transistor Tdr1 or Tdr2 may apply a driving current to the plurality of light sources 111 based on a voltage output by the storage capacitor Cs1 or Cs2.

The switching transistor Tsw1 or Tsw2 also includes an input terminal, an output terminal, and a control terminal. The input terminal of the switching transistor Tsw1 or Tsw2 may be connected to the data line D1 or D2, and the output terminal of the switching transistor Tsw1 or Tsw2 may be connected to the control terminal of the driving transistor Tdr1 or Tdr2. The control terminal of the switching transistor Tsw1 or Tsw2 may be connected to the scan line S1 or S2.

The switching transistor Tsw1 or Tsw2 may be turned on by a scan signal of the scan line S1 or S2, and may deliver a dimming signal of the data line D1 or D2 to the storage capacitor Cs1 or Cs2 and the driving transistor Tdr1 or Tdr2. The dimming signal of the data line D1 or D2 may be input to the control terminal of the driving transistor Tdr1 or Tdr2, and the driving transistor Tdr1 or Tdr2 may apply a driving current corresponding to the dimming signal to the light sources 111. The storage capacitor Cs1 or Cs2 may store charges from the dimming signal, and output a voltage corresponding to the dimming signal.

After this, even when the inputting of the scan signal may be stopped and the switching transistor Tsw1 or Tsw2 may be turned off, the storage capacitor Cs1 or Cs2 may still output the voltage corresponding to the dimming signal, and the driving transistor Tdr1 or Tdr2 may still apply the driving current corresponding to the dimming signal to the light sources 111.

The circuit as shown in FIG. 14 is merely an example of the driving device 300, and is not limited thereto. The driving device 300 may include a 3T1C topology circuit obtained by adding a transistor to compensate for body effect of the driving transistor Tdr.

The driving device 300 may be provided in a single chip in which the circuit shown in FIG. 14 is integrated. In other words, the circuit shown in FIG. 14 may be integrated in a single semiconductor chip. For example, the driving device 300 may be an integrated circuit or an active matrix integrated circuit (AM IC).

According to the disclosure, a display apparatus and backlight unit may attain high brightness and a high contrast ratio with a reduced number of LEDs by applying a plurality of bar-shaped light source modules. For the backlight unit, error rates may also be reduced while the productivity may be improved, and repair of the backlight unit may become easy.

The display apparatus and backlight unit may enable enhanced local dimming by a dimming driver providing signals to driving devices included in bar type light source modules. In addition, compared to the existing direct type, the number of signal pins of the dimming driver may be reduced.

Several embodiments of the disclosure have been described above, but a person of ordinary skill in the art will understand and appreciate that various modifications can be made without departing from the scope of the disclosure. Thus, it will be apparent to those or ordinary skill in the art that the true scope of technical protection is only defined by the following claims.

What is claimed is:
1. A display apparatus comprising:
a liquid crystal panel; and
a backlight unit configured to emit light to the liquid crystal panel, wherein the backlight unit comprises:
a bottom chassis;
a first interface board disposed on a front surface of the bottom chassis;

a plurality of light source modules disposed on the front surface of the bottom chassis, arranged at predetermined intervals,
- wherein a first group of light source modules among the plurality of light source modules have one end connected to one side of the first interface board; and
- wherein a second group of light source modules among the plurality of light source modules have one end connected to an other side of the first interface board, the one side of the first interface board being opposite the other side of the first interface board; and a second interface board disposed on a rear surface of the bottom chassis and connected to the first interface board, wherein each of the plurality of light source modules comprises:
- a substrate; and
- a plurality of light sources that are mounted on the substrate in a first plurality of rows or a first plurality of columns;
- a plurality of dimming blocks formed to include at least one of the plurality of light sources; and
- a plurality of driving devices mounted on the substrate at the predetermined intervals and configured to control the at least one of the plurality of light sources included in each of the plurality of dimming blocks, and wherein the first interface board comprises a plurality of terminals provided at the predetermined intervals on the one side of the first interface board and the other side of the first interface board to connect the substrate of each of the plurality of light source modules to the first interface board.

2. The display apparatus of claim 1, wherein the plurality of dimming blocks are divided into a first group and a second group,
- wherein the plurality of driving devices comprises a first driving device and a second driving device,
- wherein the first driving device is configured to control first light sources included in dimming blocks of the first group, and
- wherein the second driving device is configured to control second light sources included in dimming blocks of the second group.

3. The display apparatus of claim 1, further comprising:
- a dimming driver mounted on the first interface board or the second interface board, the dimming driver being configured to provide dimming signals to the plurality of driving devices based on dimming data transmitted from a processor.

4. The display apparatus of claim 3, wherein the dimming driver is configured to provide the dimming signals to the plurality of driving devices in an active matrix method.

5. The display apparatus of claim 4, wherein the plurality of driving devices define a second plurality of rows and a second plurality of columns, and
- wherein the dimming driver is configured to provide a scan signal to the plurality of driving devices arranged in one of the second plurality of rows, and provide the dimming signals to the plurality of driving devices in the second plurality of columns.

6. The display apparatus of claim 1, wherein each of the plurality of dimming blocks comprises two or more neighboring light sources.

7. The display apparatus of claim 1, wherein each of the plurality of light sources comprises a light emitting diode (LED) contacting wiring on the substrate; and
an optical dome covering the LED.

8. The display apparatus of claim 1, wherein each of the plurality of light source modules comprises a connector arranged at the one end of the substrate to couple the substrate to the first interface board.

9. The display apparatus of claim 1, further comprising:
- a connection line passing through the bottom chassis and connecting between the first interface board and the second interface board.

10. A backlight unit comprising:
- a bottom chassis;
- a first interface board disposed on a front surface of the bottom chassis;
- a plurality of light source modules disposed on the front surface of the bottom chassis, arranged at predetermined intervals,
  - wherein a first group of light source modules among the plurality of light source modules have one end connected to one side of the first interface board, and
  - wherein a second group of light source modules among the plurality of light source modules have one end connected to an other side of the first interface board, the one side of the first interface board being opposite the other side of the first interface board; and
- a second interface board disposed on a rear surface of the bottom chassis and connected to the first interface board, and wherein each of the plurality of light source modules comprises:
- a substrate;
- a plurality of light sources that are mounted on the substrate in a first plurality of rows or a first plurality of columns;
- a plurality of dimming blocks formed to include at least one of the plurality of light sources; and
- a plurality of driving devices mounted on the substrate at the predetermined intervals and configured to control the at least one of the plurality of light sources included in each of the plurality of dimming blocks, and wherein the first interface board comprises a plurality of terminals provided at the predetermined intervals on the one side of the first interface board and the other side of the first interface board to connect the substrate of each of the plurality of light source modules to the first interface board.

11. The backlight unit of claim 10, wherein the plurality of dimming blocks are divided into a first group and a second group,
- wherein the plurality of driving devices comprises a first driving device and a second driving device,
- wherein the first driving device is configured to control first light sources included in dimming blocks of the first group, and
- wherein the second driving device is configured to control second light sources included in dimming blocks of the second group.

12. The backlight unit of claim 10, further comprising:
- a dimming driver mounted on the first interface board or the second interface board, the dimming driver being configured to provide dimming signals to the plurality of driving devices based on dimming data transmitted from a processor.

13. The backlight unit of claim 12, wherein the dimming driver is configured to provide the dimming signals to the plurality of driving devices in an active matrix method.

14. The backlight unit of claim 13, wherein the plurality of driving devices define a second plurality of rows and a second plurality of columns, and
   wherein the dimming driver is configured to provide a scan signal to the plurality of driving devices arranged in one of the second plurality of rows, and provide the dimming signals to the plurality of driving devices in the second plurality of columns.

15. The backlight unit of claim 10,
   wherein each of the plurality of dimming blocks comprises two or more neighboring light sources.

16. The backlight unit of claim 10, wherein each of the plurality of light sources comprises:
   a light emitting diode (LED) contacting wiring on the substrate; and
   an optical dome covering the LED.

17. The backlight unit of claim 10, wherein each of the plurality of light source modules comprises a connector arranged at the one end of the substrate to couple the substrate to the first interface board.

18. The backlight unit of claim 10, further comprising: a connection line passing through the bottom chassis and connecting between the first interface board and the second interface board.

* * * * *